(12) United States Patent
Virtej et al.

(10) Patent No.: US 10,856,191 B1
(45) Date of Patent: Dec. 1, 2020

(54) USER EQUIPMENT CONFIGURATION

(71) Applicant: Nokia Technologies OY, Espoo (FI)

(72) Inventors: Elena Virtej, Espoo (FI); Seppo Hamalainen, Espoo (FI); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/677,823

(22) Filed: Nov. 8, 2019

(51) Int. Cl.
*H04W 36/00* (2009.01)
*G06N 20/00* (2019.01)
*H04W 36/30* (2009.01)
*H04W 36/38* (2009.01)

(52) U.S. Cl.
CPC ........ *H04W 36/0069* (2018.08); *G06N 20/00* (2019.01); *H04W 36/0058* (2018.08); *H04W 36/0072* (2013.01); *H04W 36/30* (2013.01); *H04W 36/38* (2013.01)

(58) Field of Classification Search
CPC . H04W 76/15; H04W 36/0069; H04W 76/27; H04W 24/10; H04W 36/30; H04W 36/08; H04W 74/0833; H04W 88/06; H04W 72/0413; H04W 76/10; H04W 76/19; H04W 36/06; H04W 36/305; H04W 36/0058; H04W 36/0072; G06N 20/00
See application file for complete search history.

(56) References Cited

U.S. PATENT DOCUMENTS

| | | | |
|---|---|---|---|
| 9,210,625 B1* | 12/2015 | Lovlekar | H04W 36/0066 |
| 10,299,278 B1* | 5/2019 | Jorgovanovic | H04W 4/80 |
| 2016/0073367 A1* | 3/2016 | Li | H04W 56/0045 370/350 |
| 2019/0342807 A1* | 11/2019 | Harada | H04W 24/10 |
| 2019/0387561 A1* | 12/2019 | Paladugu | H04W 8/24 |
| 2020/0007282 A1* | 1/2020 | Yoon | H04W 24/10 |

* cited by examiner

*Primary Examiner* — Ernest G Tacsik
(74) *Attorney, Agent, or Firm* — Harness, Dickey & Pierce, P.L.C.

(57) ABSTRACT

A network apparatus may include a memory and processing circuitry configured to receive first connection metrics of a connection with a user equipment that is using a first configuration during a first connected state; receive second connection metrics of the connection with the user equipment during a transition to a second connected state; choose a selected configuration as (i) the first configuration or (ii) a second configuration for the second connection state based on the first connection metrics and the second connection metrics; and send the selected configuration to the user equipment.

21 Claims, 12 Drawing Sheets

USER EQUIPMENT CONFIGURATION

TECHNICAL FIELD

One or more embodiments relate to user equipment (UE) configuration in dual connectivity (DC) scenarios.

BACKGROUND

In the field of wireless communication, many scenarios involve user equipment (UE) devices, such as mobile phones, that communicate with serving cells via carrier aggregation (CA), in which the user equipment communicates with a serving cell by concurrently using two or more component carriers, and/or dual connectivity (DC), in which the UE communicates concurrently with multiple serving cells, including a primary cell (PCell) and one or more secondary cells (SCells). The UE may transition among an idle state, an inactive state, and a connected state, as may be defined by a radio resource control (RRC) protocol. When the UE transitions to a second connected state, the UE initiates carrier aggregation setup, including a measurement of connection metrics of indicating connection quality to a serving cell, such as the PCell and/or SCell, such as channel quality indicator (CQI), reference signal received power (RSRP), and reference signal received quality (RSRQ). The UE transmits a measurement report to a network element, such as the PCell or the SCell, which generates a UE serving cell configuration that the UE is to use in connecting to the serving cells. The process of transitioning the UE to a second connected state may involve a measurement operation across a range of frequency layers, a PCell setup operation, a configuration operation based on the UE serving cell configuration, and an activation operation. Together, these operations may cause a significant delay in configuring the UE to transition to the second connected state, of at least 640 milliseconds (depending on the number of different frequency layers UE measures).

SUMMARY

The scope of protection sought for some example embodiments is set out by the independent claims. The example embodiments and features, if any, described in this specification that do not fall under the scope of the independent claims are to be interpreted as examples useful for understanding some example embodiments.

Some example embodiments may include a network apparatus including a memory and processing circuitry configured to receive first connection metrics of a connection with a user equipment that is using a first configuration during a first connected state; receive second connection metrics of the connection with the user equipment during a transition to a second connected state; choose a selected configuration as (i) the first configuration or (ii) a second configuration for the second connection state based on the first connection metrics and the second connection metrics; and send the selected configuration to the user equipment.

Some example embodiments may include a method of configuring user equipment, including receiving, by processing circuitry, first connection metrics of a connection with a user equipment that is using a first configuration during a first connected state; receiving, by the processing circuitry, second connection metrics of the connection with the user equipment during a transition to a second connected state; choosing, by the processing circuitry, a selected configuration as (i) the first configuration or (ii) a second configuration for the second connection state based on the first connection metrics and the second connection metrics; and sending, by the processing circuitry, the selected configuration to the user equipment.

Some example embodiments may include a network apparatus including a memory and processing circuitry configured to receive first connection metrics of a connection with a user equipment using a first configuration during a first connected state; receive second connection metrics of the connection with the user equipment during a transition to a second connected state; choose a selected configuration as the first configuration based on a metrics similarity of the first connection metrics and the second connection metrics being within a threshold; generate the selected configuration as a second configuration for the second connection state based on the metrics similarity of the first connection metrics and the second connection metrics exceeding the threshold; and send the selected configuration to the user equipment.

In some example embodiments, the first connection metrics and the second connection metrics may include a metric selected from a metric set comprising a timing advance metric, a reference signal received power metric, a reference signal received quality metric, a reference signal signal-to-interference-and-noise metric, a received signal strength indicator metric, a channel state information metric, a channel quality information metric, a selected beam index metric, and a cell occupancy time metric.

In some example embodiments, the processing circuitry of a network apparatus may be configured to choose a selected configuration as the first configuration based on a value in the first connection metrics matching a corresponding value in the second connection metrics, and to choose the selected configuration as the second configuration based on the value in the first connection metrics differing from the corresponding value in the second connection metrics. In some example embodiments, the value in the first connected state includes a serving cell identifier of the connection during the first connected state, and the corresponding value in the second connected state includes the serving cell identifier of the connection during the transition to the second connected state.

In some example embodiments, the first connection metrics and the second connection metrics include a timing offset metric, and the processing circuitry of a network apparatus may be configured to generate the timing offset metric by receiving from the user equipment a timing advance and estimating the timing offset metric based on the timing advance. In an example embodiment, the user equipment 100 may send to the network apparatus 300 a preamble (on PRACH), and the processing circuitry 104 of the network apparatus 300 may be configured to estimate a timing offset. The processing circuitry 104 of the network apparatus 300 may then be configured to compare the current estimated timing advance value to a previously saved timing advance value, and if a difference of the timing advances is within a threshold, the processing circuitry 104 of the network apparatus 300 may be configured to choose the first configuration as the selected configuration. The processing circuitry 104 of the network apparatus 300 may be configured to maintain an absolute timing advance metric of the user equipment 100 as a previous timing advance metric when releasing the connection. Alternatively, the processing circuitry 104 of the network apparatus 300 may be configured to update the previous timing advance metric of the user equipment 100 when sending the timing advance command to the user equipment 100. The processing circuitry 104 of the network apparatus 300 may be configured to refrain from updating the previous timing advance in case the user equipment 100 does not receive the timing advance command (for example, HARQ_ACK not received).

In some example embodiments, the processing circuitry of a network apparatus may be configured to generate at least one value of the first connection metrics or the second connection metrics by averaging a first value received from the user equipment at a first time and a second value received from the user equipment at a second time.

In some example embodiments, the processing circuitry of a network apparatus may be configured to receive the second connection metrics by performing a connection establishment to establish the connection with the user equipment during the transition, and receiving the second connection metrics within the connection establishment.

In some example embodiments, the processing circuitry of a network apparatus may be configured to receive the second connection metrics by receiving from the user equipment an indicator of an availability of the second connection metrics, sending to the user equipment a request for the second connection metrics, and receiving a response from the user equipment that includes the second connection metrics.

In some example embodiments, the processing circuitry of a network apparatus may be configured to receive the second connection metrics by sending to the user equipment a request to measure the second connection metrics, and receiving a response from the user equipment that includes the second connection metrics in response to the request.

In some example embodiments, the processing circuitry of a network apparatus may be configured to choose the selected configuration as the second configuration by generating the second configuration based on the second connection metrics. In some example embodiments, the processing circuitry of a network apparatus may be configured to generate the second configuration metrics by receiving from the user equipment a connection metrics report including at least one additional connection metric, and generating the second configuration based on the connection metrics report.

In some example embodiments, the processing circuitry of a network apparatus may be configured to choose the selected configuration by determining a similarity between the first connection metrics and the second connection metrics, choosing the first configuration based on the similarity being within a threshold, and choosing the second configuration based on the similarity exceeding the threshold.

In some example embodiments, each of the first connection metrics and the second connection metrics includes at least two values. In some example embodiments, the processing circuitry of a network apparatus may be configured to choose the selected configuration by, for each value of the first connection metrics, determining a similarity between the value and a corresponding value of the second connection metrics, and choosing the selected configuration as the first configuration or the second configuration based on the similarity for each value. In some other example embodiments, the processing circuitry of a network apparatus may be configured to choose the selected configuration by, for each value of the first connection metrics, determining a similarity between the value and a corresponding value of the second connection metrics, and choosing the selected configuration as the first configuration or the second configuration based on an aggregation of the similarities of the values.

In some example embodiments, the first connection metrics may include at least two values, and the processing circuitry of a network apparatus may include a machine learning model that is trained to determine a selected value among the at least two values. The processing circuitry of the network apparatus may be configured to choose the selected configuration by invoking the machine learning model with the first connection metrics and the second connection metrics to determine the selected value and choosing the selected configuration based on the selected value of the first connection metrics and a corresponding value of the second connection metrics. In some example embodiments, the processing circuitry of the network apparatus may be further configured to train the machine learning model based upon connections with other user equipment. In some other example embodiments, the processing circuitry of the network apparatus may be further configured to train the machine learning model based upon previous connections with the user equipment.

In some example embodiments, the processing circuitry of a network apparatus may include a machine learning model that is trained to output a selected configuration the first connection metrics, and the second connection metrics, and the processing circuitry may be configured to choose the selected configuration by invoking the machine learning model with the first connection metrics and the second connection metrics and choosing the selected configuration that is output from the machine learning model.

BRIEF DESCRIPTION OF THE DRAWINGS

At least some example embodiments will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of a radio network element or radio access network (RAN) element (e.g., a base station, eNodeB (eNB), gNB, Central Unit (CU), ng-eNB, etc.), user equipment (UE), or the like, it should be understood that one or more example embodiments discussed herein may be performed by the one or more processors (or processing circuitry) at the applicable device or network element. For example, according to one or more example embodiments, at least one memory may include or store computer program code, and the at least one memory and the computer program code may be configured to, with at least one processor, cause a network node to perform the operations discussed herein. As discussed herein, UE and User may be used interchangeably.

It will be appreciated that a number of example embodiments may be used in combination.

I. Apparatuses

Figure 1:
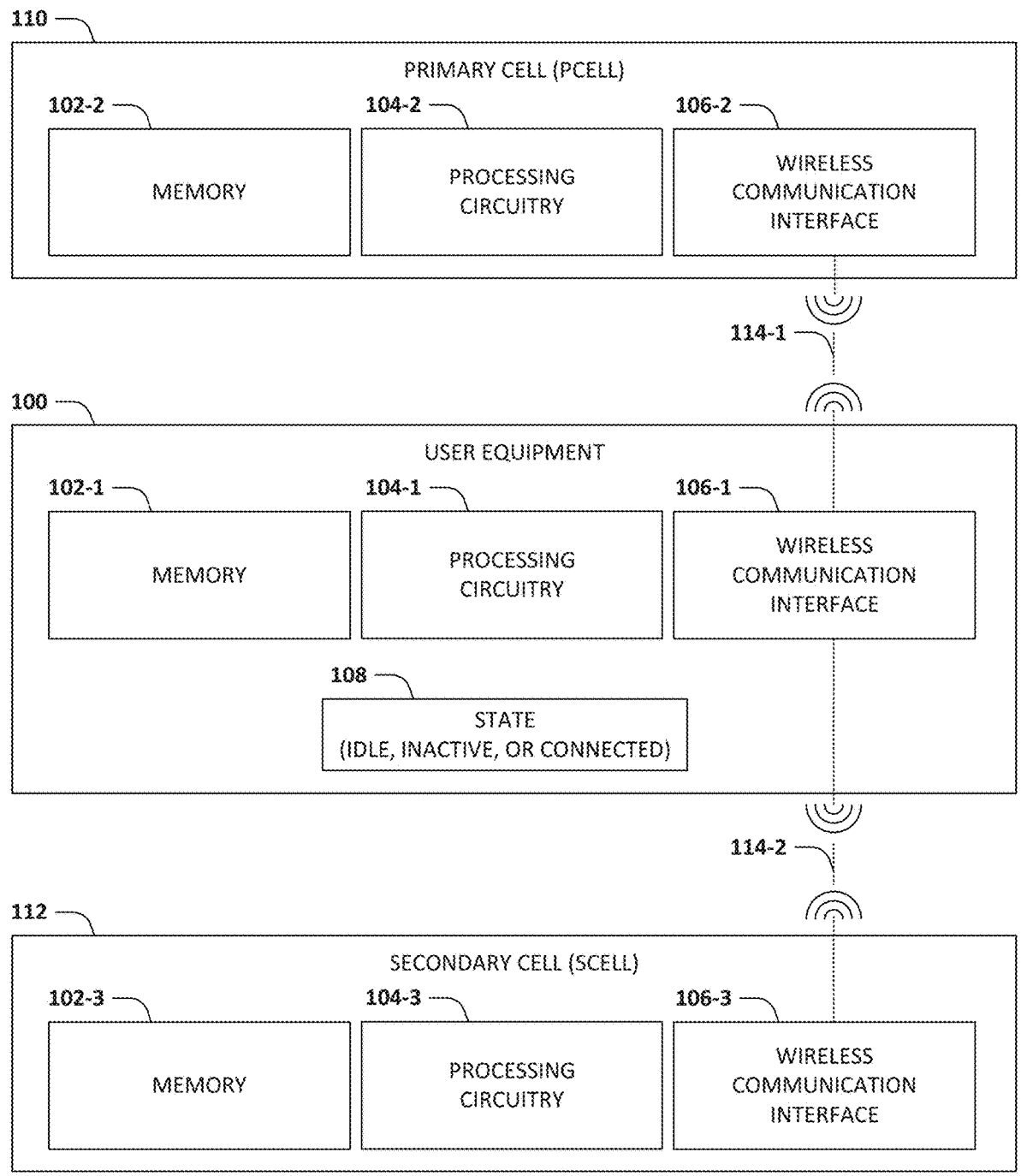
FIG. 1 is a diagram of an example set of apparatuses according to some example embodiments.

FIG. 1 is a diagram of an example set of apparatuses according to some example embodiments. The set of apparatuses includes a user equipment 100, such as a mobile phone, a portable computer in a tablet or palmtop form factor, a wearable device, etc., that is configured to communicate with a primary cell (PCell) 110 and a secondary cell (SCell) 112. The user equipment 100 includes a memory 102-1, processing circuitry 104-1, and a wireless communication interface 106-1 that causes the user equipment 100 to operate in a carrier aggregation (CA)/dual connectivity (DC) configuration. FIG. 1 is just an example and should not be limited just to CA/DC type of communication, but could refer to also to other forms of dual connectivity or multi-connectivity, such as EN-DC, NE-DC, NR-DC, etc. Each of the primary cell 110 and the secondary cell 112 may also include a memory 102-2, 102-3, processing circuitry 104-2, 104-3, and a wireless communication interface 106-2, 106-3 that enables wireless communication with the user equipment 100, and optionally with each other. For example, the user equipment 100 may use the wireless communication interface 106-1 to communicate, concurrently, with the wireless communication interface 106-2 of the primary cell 110 via a first connection 114-1 and the wireless communication interface 106-3 of the secondary cell 112 via a second connection 114-2. The user equipment 100 may transition among a set of states 108, including an idle state, an inactive state, and a second connected state.

In some example embodiments, the processing circuitry 104-1, 104-2, 104-3 of the user equipment 100, the primary cell 110, and the secondary cell 112 may include hardware such as logic circuits; a hardware/software combination, such as a processor executing software; or a combination thereof. For example, a processor may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some configurations, the processing circuitry 104-1, 104-2, 104-3 may be configured to load and execute instructions stored in the memory 102-1, 102-2, 102-3 of the apparatus, where such loading and execution causes the apparatus to operate as a special-purpose apparatus that is configured to perform the operations encoded by the instructions. Hereinafter, the memory of an apparatus (such as 102-1, 102-2, and 102-3) is generally referred to as memory 102; the processing circuitry of an apparatus (such as 104-1, 104-2, and 104-3) is generally referred to as processing circuitry 104; and the wireless communication interface of an apparatus (such as 106-1, 106-2, and 106-3) is generally referred to as wireless communication interface 106.

Figure 2:
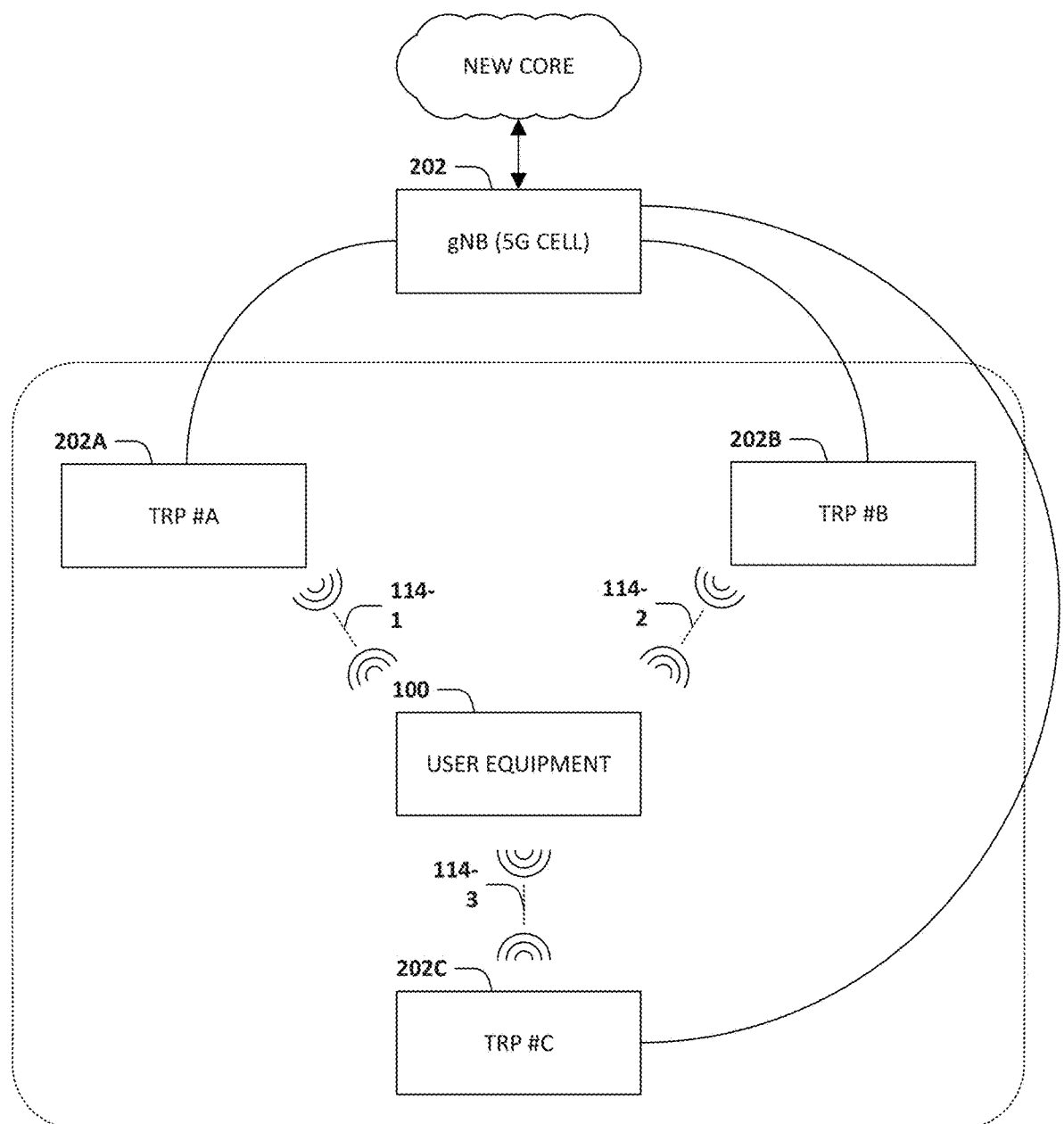
FIG. 2 is a diagram illustrating an example neural network that may be processed by an apparatus according to some example embodiments.

FIG. 2 illustrates a simplified diagram of a portion of a 3rd Generation Partnership Project (3GPP) New Radio (NR) access deployment for explaining some example embodiments.

Referring to FIG. 2, the 3GPP NR radio access deployment includes a gNB 202 having transmission and reception points (TRPs) 202A, 202B, 202C, each of which may operate as a primary cell 110 and/or a secondary cell 112. Each TRP 202A, 202B, 202C may be, for example, a remote radio head (RRH) or remote radio unit (RRU) including at least, for example, a radio frequency (RF) antenna (or antennas) or antenna panels, and a radio transceiver, for transmitting and receiving data within a geographical area. In this regard, the TRPs 202A, 202B, 202C provide cellular resources for user equipment 100 within a geographical coverage area. In some cases, baseband processing may be divided between the TRPs 202A, 202B, 202C and gNB 202 in a 5th Generation (5G) cell. Alternatively, the baseband processing may be performed at the gNB 202. In the example shown in FIG. 2, the TRPs 202A, 202B, 202C are configured to communicate with the user equipment 100 via one or more transmit (TX)/receive (RX) beam pairs. The gNB 202 communicates with the core network, which is referred to as the New Core in 3GPP NR.

In some example embodiments, one or more of the TRPs 202A, 202B, 202C may include independent schedulers. In some example embodiments, the gNB 202 may perform joint scheduling among two or more of the TRPs 202A, 202B, 202C.

Although only a single user equipment 100 is shown in FIG. 2, the gNB 202 and TRPs 202A, 202B, 202C may provide communication services to a relatively large number of user equipment apparatuses 100 within the coverage area of the TRPs 202A, 202B, 202C. For the sake of clarity of example embodiments, communication services (including transmitting and receiving wireless signals, data, traffic or traffic flows, etc.) will be discussed as between the gNB 202 and the user equipment 100. It should be understood, however, that signals, data, traffic or traffic flows, etc., may be transmitted between the user equipment 100 and one or more of the TRPs 202A, 202B, 202C.

In some example embodiments, 3GPP NR systems may support use cases with relatively tight reliability and latency requirements. The 3GPP NR Release 16 (Rel-16) Work Item description for NR Industrial Internet of Things (IIoT), for example, envisions the support of Time-Sensitive Communications (TSC) through the 3GPP NR system.

In scenarios such as shown in FIG. 1 and FIG. 2, the state 108 of user equipment 100 communicating in a CA/DC configuration may transition, for example, among an idle state 108, an inactive state 108, and a second connected state 108. Transitioning to the second connected state 108 may involve multiple operations, such as a measurement operation across a range of frequency layers, a primary cell 110 setup operation, a configuration operation based on the user equipment serving cell configuration, and an activation operation. For example, the user equipment 100 may determine values of one or more connection metrics, such as channel quality indicator (CQI), reference signal received power (RSRP), and reference signal received quality (RSRQ), and may transmit the connection metrics to a primary cell 110 and/or a secondary cell 112, which may determine and send to the user equipment 100 a configuration that the user equipment 100 is permitted to use. However, together, these operations may cause a significant delay in configuring the UE to transition to the second connected state. For example, the user equipment 100 may be configured based on network metrics that are measured by the user equipment 100 upon entering the connected state, during which the user equipment 100 may perform 480*(number_of frequency_layers) measurements. The completion of the measurements, together with PCell setup, configuration, and activation, may cause a delay of the user equipment 100 to enter the connected state of approximately 640 milliseconds. This may be a minimum delay experienced by a UE that transits from inactive/idle state to connected to the point of having the CA/DC configured. For example, the delay may scale up by the number of different frequency layers that the UE measures. The delay may be apparent as latency to a user of the user equipment 100, who may be waiting to use the user equipment 100 in the connected mode 108, and/or to applications executed by or through the user equipment 100, the primary cell 110, and/or the secondary cell 112, where the processing of the application may be delayed due to the duration of the transition the second connected state 108. Additionally, the collection of connection metrics may consume some resources of the user equipment 100, including processing capacity, communication bandwidth, and/or power consumption from a power source such as a battery.

A first alternative that may facilitate the user equipment 100 to complete the transition of the user equipment 100 to the second connected state 108 involves a "blind configuration," in which a network apparatus, such as a primary cell 110 or a secondary cell 112, is configured to send a user equipment configuration to the user equipment 100 without awaiting the connection metrics of the user equipment 100. However, a "blind configuration" that is not based on the connection metrics of the user equipment 100 may result in a misconfiguration or a sub-optimal configuration, for example, an allocation of the user equipment 100 to a primary cell 110 and/or a secondary cell 112 that has a slower and/or lower-quality connection with the user equipment 100 than another available primary cell 110 and/or secondary cell 112.

A second alternative that may facilitate the user equipment 100 to complete the transition of the user equipment 100 to the second connected state involves a "semi-blind" configuration, in which a network apparatus is configured to send to the user equipment 100 the same user equipment configuration that the user equipment 100 was using before transitioning to the second connected state 108. For example, the user equipment 100 may have previously communicated with a primary cell 110 and/or secondary cell 112 using a first configuration (for example, before transitioning to an idle state 108 or an inactive state 108), and when the user equipment 100 transitions to the second connected state 108, the network apparatus may configure the user equipment 100 with the same first configuration as previously utilized. In some cases, the first configuration may be suitable for the connection metrics of the user equipment 100; but in other cases, the first configuration may not be suitable for the connection metrics of the user equipment 100, for example, based upon the user equipment 100 physically moving from a first location to a second location, and/or based on the wireless communication interface 106-1 and/or connection metrics of the user equipment 100 changing between the previous connection and the current connection. Configuring the user equipment 100 with the same first configuration as previously utilized may therefore result in reduced connection quality, performance, and/or efficient utilization of the wireless network.

A third alternative involves configuring the user equipment 100 to perform the measurements during the idle state or the inactive state, such that the connection metrics are already available when the user equipment 100 transitions to the connected state. However, in this scenario, the network apparatus may still have to generate a new configuration for the user equipment 100 based on the new connection metrics provided by the user equipment 100.

In some cases, to reuse a previous configuration of the user equipment 100, based upon a determination of whether the connection metrics are similar to those for which the previous configuration was used during a previous connected state (e.g., in case the user equipment 100 has not physically moved, where the previous serving cell may resume serving the user equipment 100 instead of a different serving cell). In addition to facilitating (e.g., expediting) the transition of the user equipment 100 to the connected state, such reuse may enable the user equipment 100 to avoid collecting some connection metrics (e.g., may enable the user equipment 100 to avoid a full scan of 480*(number_of frequency_layers) measurements), which may conserve the resources of the user equipment 100, including processing capacity, communication bandwidth, and/or power consumption from a power source such as a battery, and to choose a new configuration, including generating a new configuration, if the connection metrics are significantly different than those of the previous connected state.

In some example embodiments, a network apparatus may be configured to configure user equipment 100 based on choosing between a first configuration previously used by the user equipment 100 based on first connection metrics and a second configuration that may be used by the user equipment 100 based on second connection metrics, for example, based on a new set of connection metrics for the connection of the user equipment 100 during a transition to a second connected state. If the second connection metrics are a reduced set of connection metrics, for example, an initial testing of the connection that the user equipment 100 may gather in a short time span, then the network apparatus may receive the second connection metrics and choose a selected configuration for the user equipment 100 within a short time span. In some example embodiments, the network apparatus may determine a similarity of the first connection metrics and the second connection metrics, for instance, whether the first connection metrics and the second connection metrics are the same or similar, based on a threshold of similarity. If a similarity of the first connection metrics and the second connection metrics is within the threshold, then the processing circuitry of the network apparatus may be configured to choose the first configuration and to send the first configuration to the user equipment 100 to cause the user equipment 100 to resume using a previous configuration. Alternatively, if the similarity of the first connection metrics and the second connection metrics exceeds the threshold, then the processing circuitry of the network apparatus may be configured to choose, and to send to the user equipment 100, a second configuration that is based on the second (that is, updated) connection metrics. In this manner, the network apparatus may facilitate the choosing of the selected configuration of the user equipment 100, such that the user equipment 100 may complete the transition to the second connected state 108 in a shorter time span that may reduce the delay and the latency perceived by the user, and/or may reduce the consumption of resources of the user equipment 100 such as processing capacity, communication bandwidth, and/or power consumption from a power source such as a battery.

In such scenarios, choosing the selected configuration of the user equipment 100 based on the first connection metrics and the second connection metrics may reflect a determination of the degree to which the connection of the user equipment 100 to the serving cell(s) has changed, such as how much the user equipment 100 has moved between the first connected state and the second connected state. In some example embodiments, basing the choice on connection metrics may be faster than other information upon which the choice might be based, such as global positioning service (GPS) coordinates and/or triangulation, which may be slower, less determinative of whether to use the first configuration or the second configuration, and/or unavailable in some scenarios, such as some user equipment 100.

In some example embodiments, processing circuitry of a network apparatus 300 may be configured to determine (e.g., via UE measurement reporting procedures) and/or to store certain selected serving cell (e.g., PCell)-related metrics of the connection of a UE before releasing the UE to IDLE. Based upon a next connection (e.g., in the same cell), the processing circuitry of the network apparatus 300 may be configured to determine a difference between last serving-cell-related metrics in CONNECTED before the IDLE/INACTIVE transition and the first metrics once back in connected. If the difference is small (e.g., within a threshold value), the processing circuitry of the network apparatus 300 may be configured to reconfigure the UE with the previously used SCell configuration.

In some example embodiments, the processing circuitry of a network apparatus 300 may be configured to perform the following operations:

a. Choose a UE with multiple serving cells configured;
  b. Store the UE's serving cell configuration and connection metrics;
    i. The connection metrics could be e.g. CQI, RSRP, RSRQ, RS-SINR, used TA, PHR value, used beam index, usage time of current configuration or other measurements received from UE or performed by network
  c. Release the UE RRC connection
  d. Upon receiving new connection establishment request from the UE, determine new values for the tracked connection metrics;
  e. Compare the stored metrics with the new connection metrics:
    i. If the difference is smaller than a determined threshold value, configure previously stored UE serving cell configuration (with multiple serving cells)
    ii. Otherwise, configure inter-frequency measurements to find candidate SCell(s).

II. Example Interactions

Figure 3:
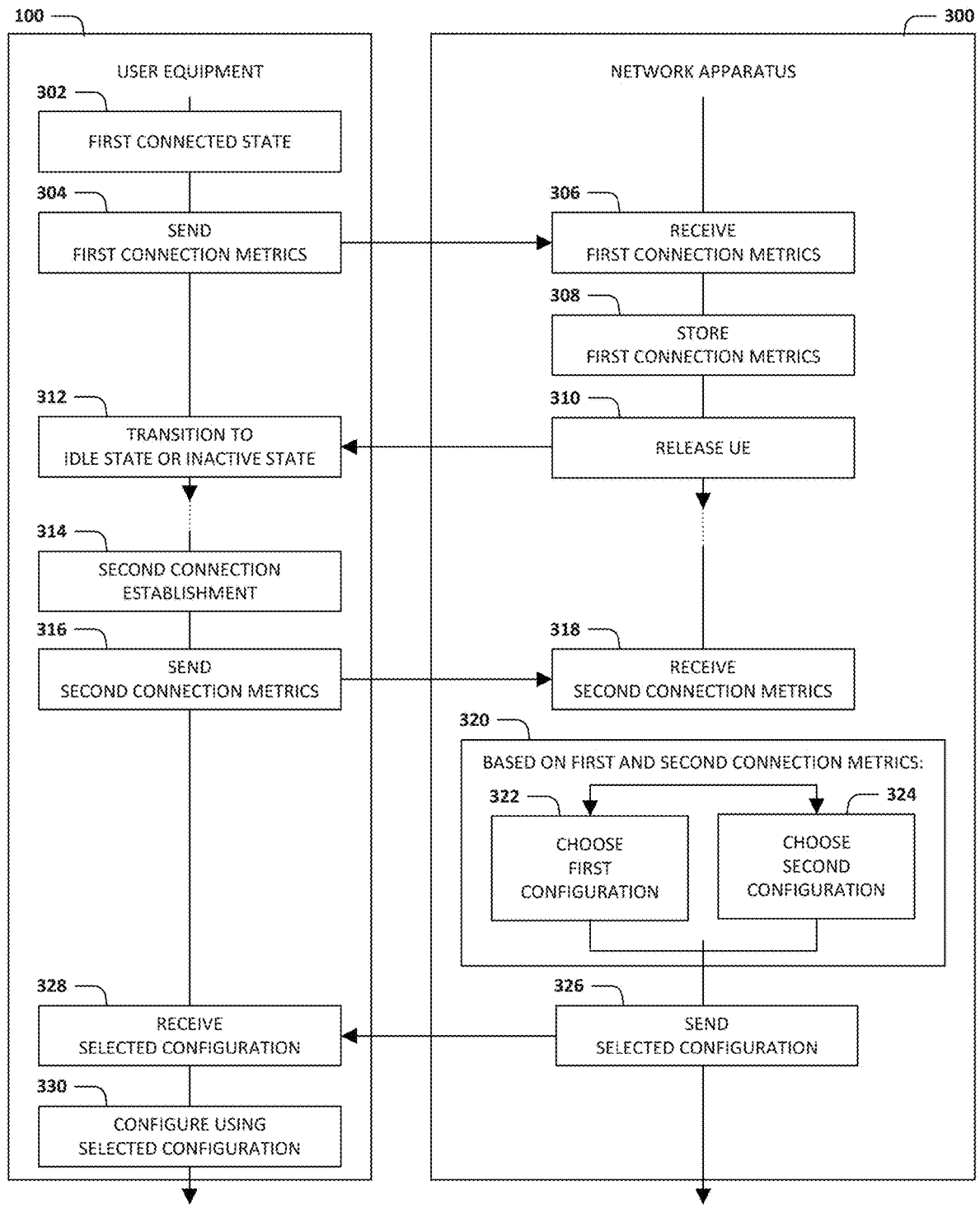
FIG. 3 is a diagram illustrating an example interaction between a user equipment and a network apparatus according to some example embodiments.

FIG. 3 is a diagram illustrating an example interaction between a user equipment 100 and a network apparatus 300 according to some example embodiments.

In the example interaction of FIG. 3, the user equipment 100 begins operation 302 in a second connected state 108 during which the user equipment 100 measures first connection metrics and sends 304 the first connection metrics to the network apparatus 300. The network apparatus 300 receives 306 the first connection metrics and stores 308 the first connection metrics. Thereafter, the network apparatus 300 then releases 310 the user equipment 100, which transitions 312 to an idle state 108 or an inactive state 108. Thereafter, a request is initiated (e.g., by the user equipment 100 or the network apparatus 300) to transition the user equipment 100 to the second connected state 108, resulting in establishing 314 a second connection. The user equipment 100 measures second connection metrics and sends 316 the second connection metrics to the network apparatus 300, which receives 318 the second connection metrics. The network apparatus 300 chooses 320 a selected configuration for the user equipment 100 based on the first connection metrics and the second connection metrics, either by choosing 322 a first configuration based on the first connection metrics that were received 306 during the first connected state 108) or by choosing 324 a second configuration for the second connection state based on the second connection metrics that were received 318 during the transition to the second connected state 108. In some example embodiments, the network apparatus 300 may be configured to choose 322 the first configuration based upon a similarity of the first connection metrics to the second connection metrics being within a threshold (e.g., based on the first connection metrics being the same as or similar to the second connection metrics, which may indicate that the connectivity of the user equipment 100 has not changed since the first connected state 302), and to choose 324 the second configuration based on the similarity of the first connection metrics exceeding the threshold (e.g., based on the first connection metrics being significantly different than the second connection metrics, which may indicate that the connectivity of the user equipment 100 has changed since the first connected state 302). The network apparatus 300 sends 326 the selected configuration to the user equipment 100, which receives 328 the selected configuration and configures 330 to operate in the second connected state 108 using the selected configuration.

The example interaction of FIG. 3 may apply to a few scenarios that may vary in some example embodiments.

In some example embodiments, the user equipment 100 may be configured to send 304 the first connection metrics to the network apparatus 300 during the initial connected state 108, for example periodically, and/or may be configured to send 304 the first connection metrics to the network apparatus 300 while transitioning 312 to the idle state 108 or the inactive state 108.

In some example embodiments, the network apparatus 300 may be configured to store 308 the first connection metrics received from the user equipment 100, may be configured to derive some additional connection metrics from the connection metrics sent by the user equipment 100, and/or may be configured to collect connection metrics of the connection with the user equipment 100 to be stored as or with (e.g., supplemental to) the first connection metrics 306.

In some example embodiments, the network apparatus 300 may be configured to initiate releasing 310 the user equipment 100 to transition to the idle state 108 or the inactive state 108, and/or may be configured to receive a request from the user equipment 100 to release 310 the user equipment 100 to transition to the idle state 108 or the inactive state 108.

In some example embodiments, the user equipment 100 may be configured to collect the second connection metrics during the idle state 106 or the inactive state 106 such that the user equipment 100 is ready to send the second connection metrics to the network apparatus 300 during the transition to the second connected state 108, and/or may be configured to collect the second connection metrics during or in response to the transition to the second connected state 108.

In some example embodiments, the user equipment 100 may be configured to send 314 to the network apparatus 300 a limited set of connection metrics as the second connection metrics, for example, an initial subset of the connection metrics that may be rapidly collected and sent 314 to the network apparatus 300. In some example embodiments, the network apparatus 300 may be configured to choose 322 the second configuration by generating the second configuration, for example, based upon the second connection metrics sent 314 by the user equipment 100, or based on additional second connection metrics that the network apparatus 300 may request the user equipment 100 to send (e.g., as a full connection metrics report) in order to generate the second configuration for the user equipment 100. Many such variations may be included in the example interaction between the user equipment 100 and the network apparatus 300 shown in FIG. 3.

Figure 4:
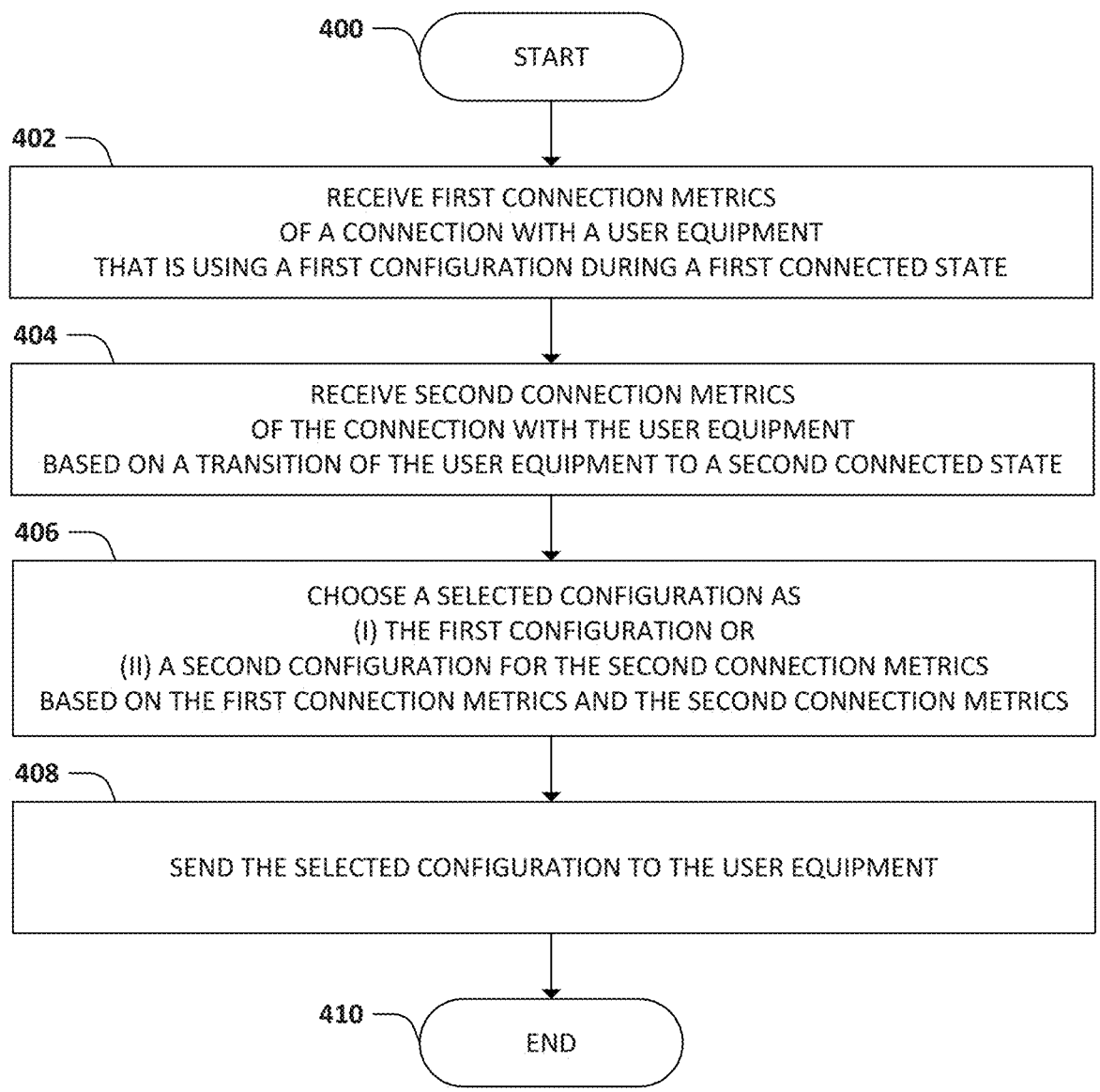
FIG. 4 is an example method of causing a network apparatus to configure user equipment according to some example embodiments.

FIG. 4 is an example method of causing a network apparatus 300 to configure user equipment 100 according to some example embodiments. In some example embodiments, a network apparatus 300, such as a serving cell operating as a primary cell 110 or a secondary cell 122, may include processing circuitry 104 that is configured to operate in accordance with the example method of FIG. 4, and may thereby cause the user equipment 100 to be configured to communicate with the network apparatus 300 or another network apparatus 300. In some example embodiments, a network apparatus 300 may be configured to store in a memory 102 a set of instructions, and processing circuitry 104 of the network apparatus 300 may be configured to execute the instructions stored in the memory 102 and therefore become a special-purpose apparatus to configure user equipment 100.

The example method begins at 400 and includes receiving 402 (e.g., by processing circuitry 104 of the network apparatus 300) first connection metrics of a connection with a user equipment 100 that is using a first configuration during a first connected state 108. The example method includes receiving 404 (e.g., by processing circuitry 104 of the network apparatus 300) second connection metrics of the connection with the user equipment 100 during a transition to a second connected state 108. The example method includes choosing 406 (e.g., by processing circuitry 104 of the network apparatus 300) a selected configuration as (i) the first configuration or (ii) a second configuration for the second connection state based on the first connection metrics and the second connection metrics. The example method includes sending 408 (e.g., by processing circuitry 104 of the network apparatus 300) the selected configuration to the user equipment 100. The example method ends at 410.

Figure 5:
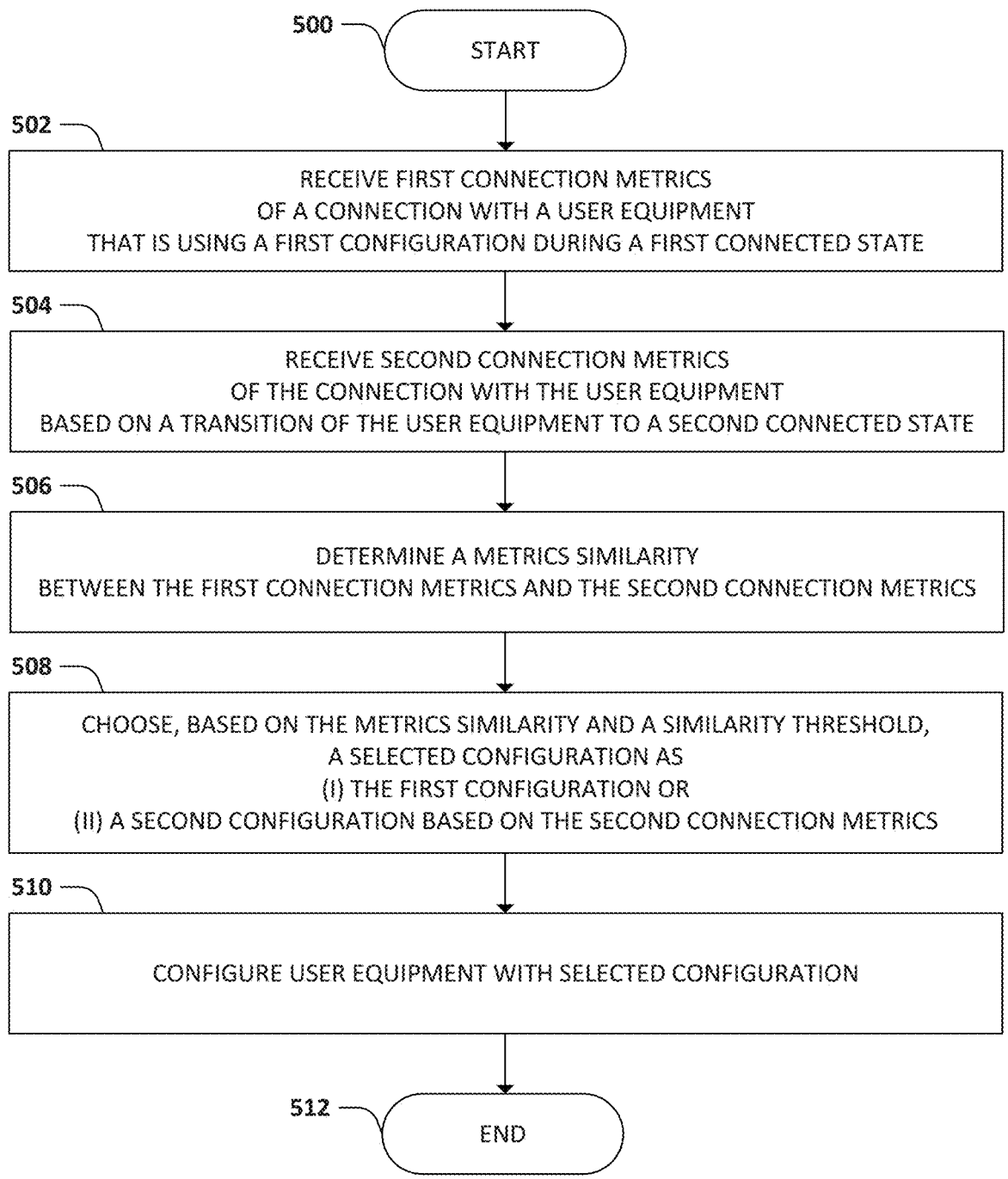
FIG. 5 is an example of another method of causing a network apparatus to configure user equipment according to some example embodiments.

FIG. 5 is an example method of causing a network apparatus 300 to configure user equipment 100 according to some example embodiments. In some example embodiments, a network apparatus 300, such as a serving cell operating as a primary cell 110 or a secondary cell 122, may include processing circuitry 104 that is configured to operate in accordance with the example method of FIG. 5, and may thereby cause the user equipment 100 to be configured to communicate with the network apparatus 300 or another network apparatus 300. In some example embodiments, a network apparatus 300 may be configured to store in a memory 102 a set of instructions, and processing circuitry 104 of the network apparatus 300 may be configured to execute the instructions stored in the memory 102 and therefore become a special-purpose apparatus to configure user equipment 100.

The example method begins at 500 and includes receiving 502 (e.g., by processing circuitry 104 of the network apparatus 300) first connection metrics of a connection with a user equipment 100 that is using a first configuration during a first connected state 108. The example method includes receiving 504 (e.g., by processing circuitry 104 of the network apparatus 300) second connection metrics of the connection with the user equipment 100 during a transition to a second connected state. The example method includes determining 506 (e.g., by processing circuitry 104 of the network apparatus 300) a metrics similarity between the first connection metrics and the second connection metrics. The example method includes choosing 508 (e.g., by processing circuitry 104 of the network apparatus 300) a selected configuration as (i) the first configuration or (ii) a second configuration based on the second connection metrics, the choosing 508 based on the metrics similarity and a similarity threshold. The example method includes configuring 510 (e.g., by processing circuitry 104 of the network apparatus 300) the use equipment 100 with the selected configuration. The example method ends at 512.

Figure 6:
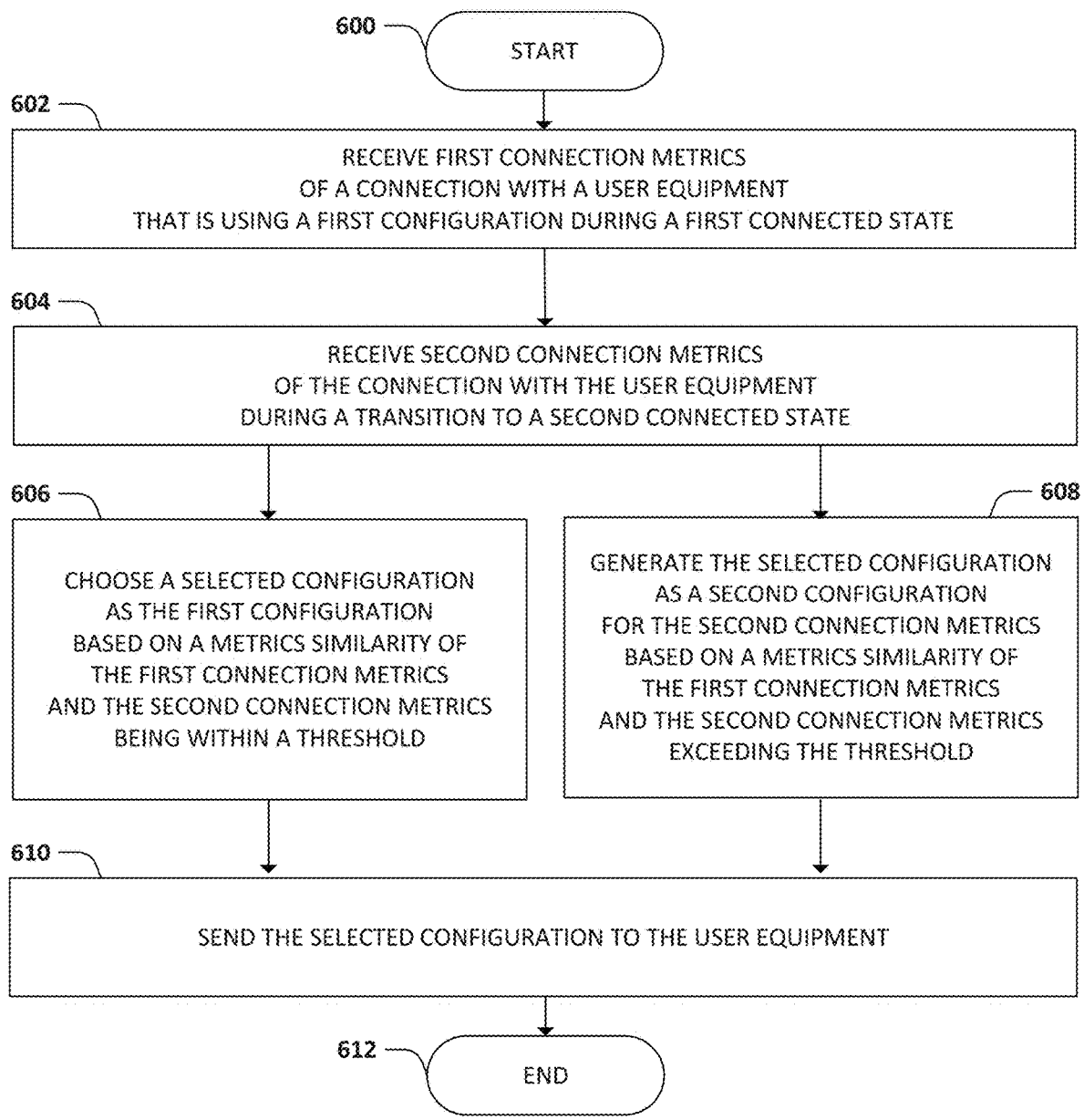
FIG. 6 is an example of another method of causing a network apparatus to configure user equipment according to some example embodiments.

FIG. 6 is an example method of causing a network apparatus 300 to configure user equipment 100 according to some example embodiments. In some example embodiments, a network apparatus 300, such as a serving cell operating as a primary cell 110 or a secondary cell 122, may include processing circuitry 104 that is configured to operate in accordance with the example method of FIG. 6, and may thereby cause the user equipment 100 to be configured to communicate with the network apparatus 300 or another network apparatus 300. In some example embodiments, a network apparatus 300 may be configured to store in a memory 102 a set of instructions, and processing circuitry 104 of the network apparatus 300 may be configured to execute the instructions stored in the memory 102 and therefore become a special-purpose apparatus to configure user equipment 100.

The example method begins at 600 and includes receiving 602 (e.g., by processing circuitry 104 of the network apparatus 300) first connection metrics of a connection with a user equipment 100 using a first configuration during a first connected state 108. The example method includes receiving 604 (e.g., by processing circuitry 104 of the network apparatus 300) second connection metrics of the connection with the user equipment 100 during a transition to a second connected state 108. The example method includes choosing 606 (e.g., by processing circuitry 104 of the network apparatus 300) a selected configuration as the first configuration based on a metrics similarity of the first connection metrics and the second connection metrics being within a threshold. The example method includes generating 608 (e.g., by processing circuitry 104 of the network apparatus 300) the selected configuration as a second configuration for the second connection state based on the metrics similarity of first connection metrics and the second connection metrics exceeding the threshold. The example method includes sending 610 (e.g., by processing circuitry 104 of the network apparatus 300) the selected configuration to the user equipment 100. The example method ends at 612.

III. Connection Metrics

In some example embodiments, the user equipment 100 and network apparatus 300 may be configured to collect and exchange connection metrics in some different ways, such as shown in the example interactions in FIGS. 7-11.

In some example embodiments, the user equipment 100 and the network apparatus 300 may be configured to collect, exchange, and evaluate a variety of connection metrics included in the first connection metrics and/or the second connection metrics. As an example, the first connection metrics and/or the second connection metrics may include a metric selected from a metric set. The metric set may include metrics that the user equipment 100 is configured to collect during an idle state and/or an inactive state, and/or that the user equipment 100 is configured to collect during a transition to the second connected state.

The metric set may include that may include a timing advance metric (TA), e.g., a timing difference between an upload transmission and a download reception time, which may be used for aligning upload transmissions to the slot timing. The network apparatus be configured to track the timing advance metric of the user equipment 100 during the connection, and/or a relative timing advance metric. Some example embodiments that include this variation may be able to obtain TA after UE has completed random access for use before sending the initial connection setup. For example, he serving cell configuration may be restored already at RRC setup. In such example embodiments, the network may track the (e.g., absolute) UE TA also during the connection in addition to the relative TA, whereas in other example embodiments, the network may only track whether UE should be given a TA command to change its TA up/down).

The metric set may include a channel state information metric (CSI) and/or a channel quality information metric (CQI). In some example embodiments, the CQI configuration may be provided to the user equipment 100 during a setup procedure (e.g., during RRCSetup), and the user equipment 100 may be configured to provide the first CQI metrics to the network apparatus promptly (e.g., with periodic CSI reporting). This may allow network to determine a rough MCS measured by UE (but which is affected by the overall interference), which may be used as an additional measurement to determine whether the channel state is substantially different from previous measurement.

In some example embodiments, the processing circuitry 104 of the network apparatus 300 may be configured to average consecutive CQI reports, for example, in order to reduce noise in the measurement of the CQI metric.

The metric set may include an RRM metric, such as (at least one of) a reference signal received power metric (RSRP), a reference signal received quality metric (RSRQ), a reference signal signal-to-interference-and-noise metric (RS-SINR), and/or a received signal strength indicator metric (RSSI). In some example embodiments, these connection metrics may be obtained after the initial setup (e.g., after initial RRC setup), although the obtaining may involve more time than collecting the CQI/TA metrics (for example, 200 milliseconds as compared with 5-10 milliseconds). In one example, before reporting, at least one measurement period is sampled by the UE.

The metric set may include a selected beam index metric, which may be used to determine if the user equipment 100 is operating under the same beam as during the first connected state. A selected beam index metric that is the same between the first connected state and the second connected state may indicate that the user equipment 100 is semi-stationary, due to the narrowness of the beams. For example, if during the connection establishment the determined beam index (based on UE signal strength) e.g. beam_index_new is the same as previously reported beam_index_previous (for example a stored last beam index at connection release), then the network apparatus may be configured to determine that the UE has not moved and that the previous SCell configuration may be used to configure the UE.

The metric set may include a cell occupancy time metric, e.g., how long the user equipment has been able to use the same SCell, and/or a count of the number of previous connections during which the user equipment 100 used the same SCell.

The metric set may include mobility history information. For example, the UE may report mobility history information, which may indicate the time that the UE spent in certain cell(s). In case the UE only reports the serving cell, the processing circuitry of a network apparatus may be configured to determine that the UE is (semi-)stationary. Alternatively, in another example, if the UE has remained in the (same) serving cell for at least a a threshold time, the processing circuitry of a network apparatus may be configured to generate a new SCell configuration.

It is to be appreciated that these example metrics represent only some of the metrics (for example, at least one of the metrics) that may be included in a metrics set from which the connection metrics may be selected in some example embodiments. Additionally, a network apparatus 300 may be configured to receive one or more connection metrics directly from the user equipment 100; to receive one or more connection metrics indirectly from the user equipment 100, e.g., by way of another user equipment 100 and/or another network apparatus 300; to collect one or more connection metrics based on the connection with the user equipment 100; to receive one or more connection metrics for the user equipment 100 from another network apparatus, such as a serving cell that previously served the user equipment 100 during the first connected state and that stored the first connection metrics for the first connected state; and/or to share the connection metrics with another network apparatus 300 and/or with the user equipment 100.

In some distributed architectures, a network apparatus 300 may combine some connection metrics for the connection with the user equipment 100 (e.g., connection metrics received directly from the user equipment 100) with some other connection metrics for the connection with the user equipment 100 (e.g., other connection metrics received from another network apparatus 300) in order to choose the selected configuration for the second connected state of the user equipment 100.

In some example embodiments, the network apparatus 300 may store the first connection metrics, the second connection metrics, the first configuration, the second configuration, and/or a record of the choosing of the selected configuration. Such stored information may be used by the network apparatus 300, for example, during a subsequent transition of the user equipment 100 to a third connected state, and/or may be shared with other network apparatuses 300 to promote connectivity with the user equipment 100.

Figure 7:
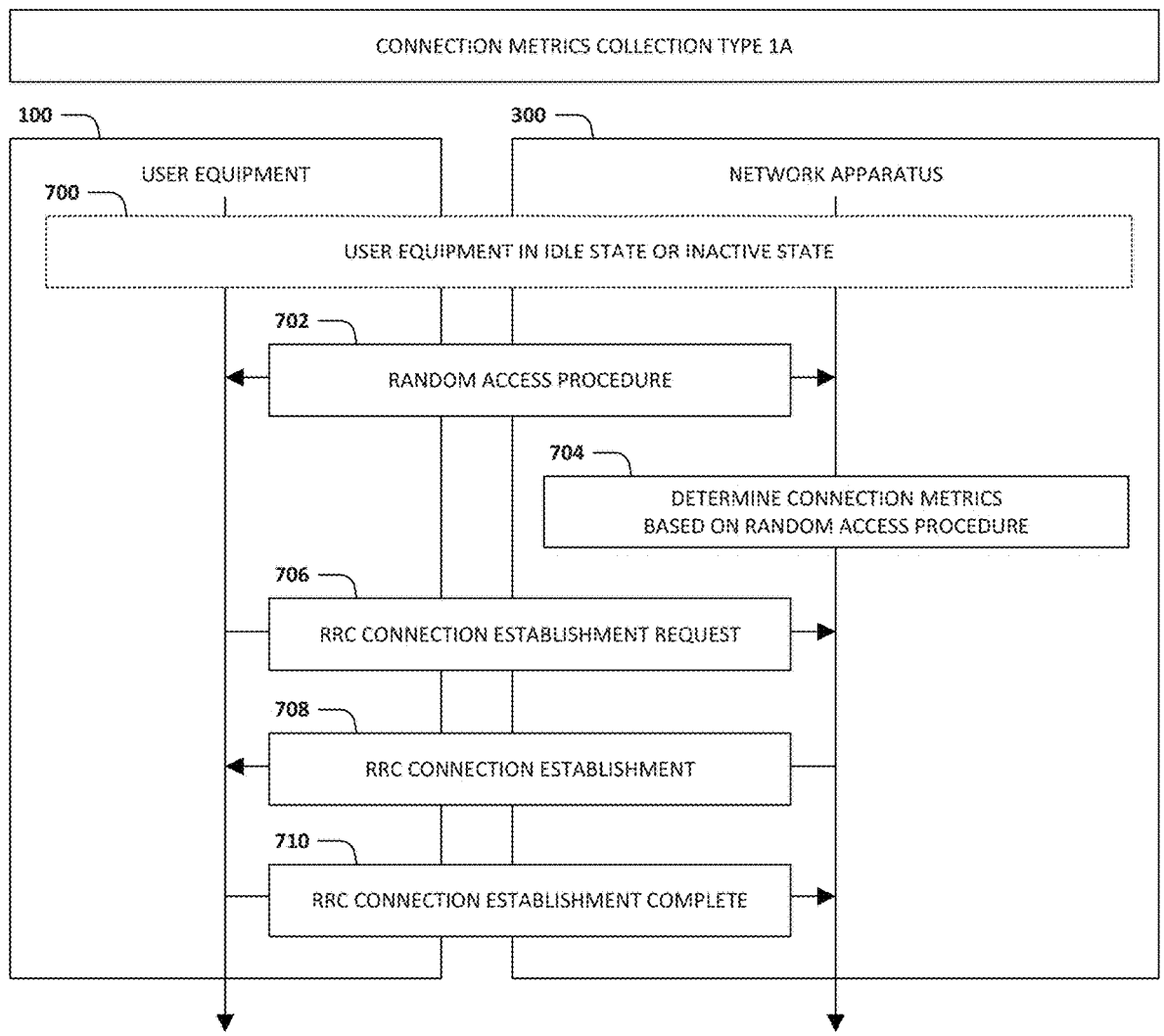
FIG. 7 is a diagram illustrating another example interaction between a user equipment and a network apparatus according to some example embodiments.

FIG. 7 is a diagram illustrating another example interaction between a user equipment and a network apparatus according to some example embodiments. The example interaction of FIG. 7 may correspond to a first example of a first measurement type in which some connection metrics, such as a timing advance metric (TA), are obtained during a transition to a connected state 108.

In the example interaction of FIG. 7, user equipment 100 is initially 700 in an idle state 108 or an inactive state 108. The user equipment 100 and the network apparatus 300 are configured to communicate in a random access procedure 702, and the processing circuitry 104 of the network apparatus 300 is configured to determine 704 connection metrics based on the random access procedure. Thereafter, the processing circuitry 104 of the user equipment 100 may be configured to initiate 706 an RRC connection establishment request message. The processing circuitry 104 of the network apparatus 300 may be configured to receive the RRC connection establishment request message and to send 708 an RRC connection establishment message. The processing circuitry 104 of the user equipment 100 may be configured to receive the RRC connection establishment message and to send 710 an RRC connection establishment completion message. In some example embodiments, the processing circuitry of the network apparatus 300 may be configured to utilize the connection metrics determined 704 during the random access procedure 702 as the second connection metrics in choosing the selected configuration to configure the user equipment 100.

In some examples, processing circuitry of a network apparatus 300 may be configured to use (at least one of) three types of measurements. As a first example, some measurements may be obtained during the course of normal connection establishment process (e.g., TA, received signal strength/quality, beam index). As a second example, some measurements may be obtained based upon the UE indicating an availability of such measurements to the network apparatus 300, which may be available (e.g., immediately) after transition to CONNECTED (e.g., early measurements, such as mobility history including cell occupancy time). This minimizes additional delay but may involve an explicit network request to obtain the measurements. As a third example, processing circuitry of a network apparatus 300 may be configured to request the UE to perform measurements when the UE is in CONNECTED. The UE may perform the measurements in response to the request and report the measurements back to network (e.g., CSI/CQI, RRM measurements). This example may take some time to complete, but serving cell measurements may be faster than neighbor cell measurements).

Figure 8:
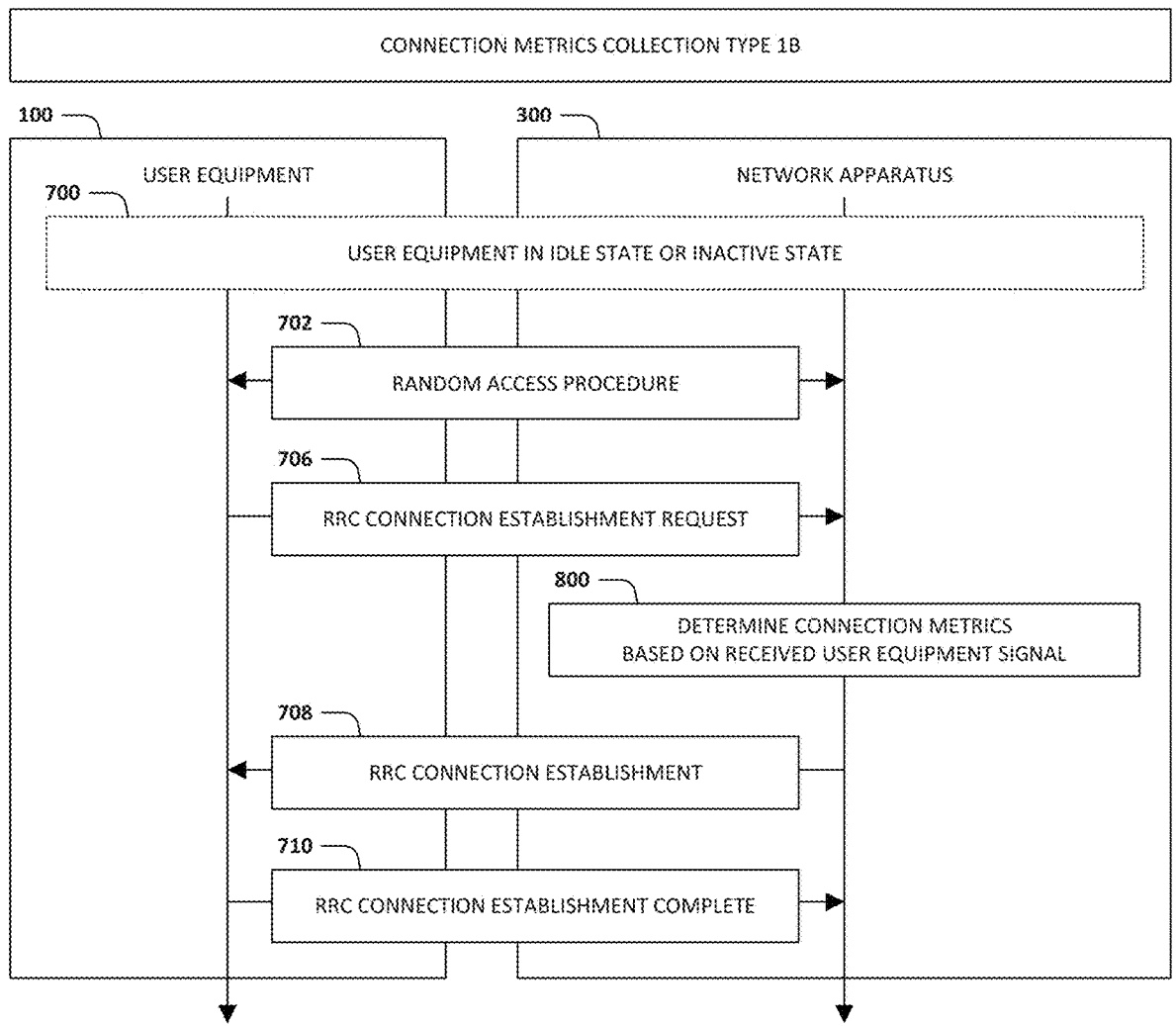
FIG. 8 is a diagram illustrating another example interaction between a user equipment and a network apparatus according to some example embodiments.

FIG. 8 is a diagram illustrating another example interaction between a user equipment and a network apparatus according to some example embodiments. The example interaction of FIG. 8 may correspond to a second example of a first measurement type in which some connection metrics, such as a received signal strength metric (RSS), a received signal quality metric (RSQ), or a beam index metric, are obtained during a transition to a connected state 108. That is, the network apparatus 300 may be configured to receive the second connection metrics by performing a connection establishment to establish the connection with the user equipment during the transition, and receiving the second connection metrics within the connection establishment.

In the example interaction of FIG. 8, user equipment 100 is initially 700 in an idle state 108 or an inactive state 108. The user equipment 100 and the network apparatus 300 are configured to communicate in a random access procedure 702. Thereafter, the processing circuitry 104 of the user equipment 100 may be configured to initiate 706 an RRC connection establishment request message. The processing circuitry 104 of the network apparatus 300 may be configured to receive the RRC connection establishment request message and to send 708 an RRC connection establishment message. The processing circuitry 104 of the user equipment 100 may be configured to receive the RRC connection establishment message and to determine 800 connection metrics during the RRC connection establishment, that is, during the transition of the user equipment 100 to the connected state 108. The processing circuitry 104 of the UE may be configured to send 710 an RRC connection establishment completion message. In some example embodiments, the processing circuitry of the network apparatus 300 may be configured to utilize the connection metrics determined 704 during the connection establishment as the second connection metrics in choosing the selected configuration to configure the user equipment 100.

Figure 9:
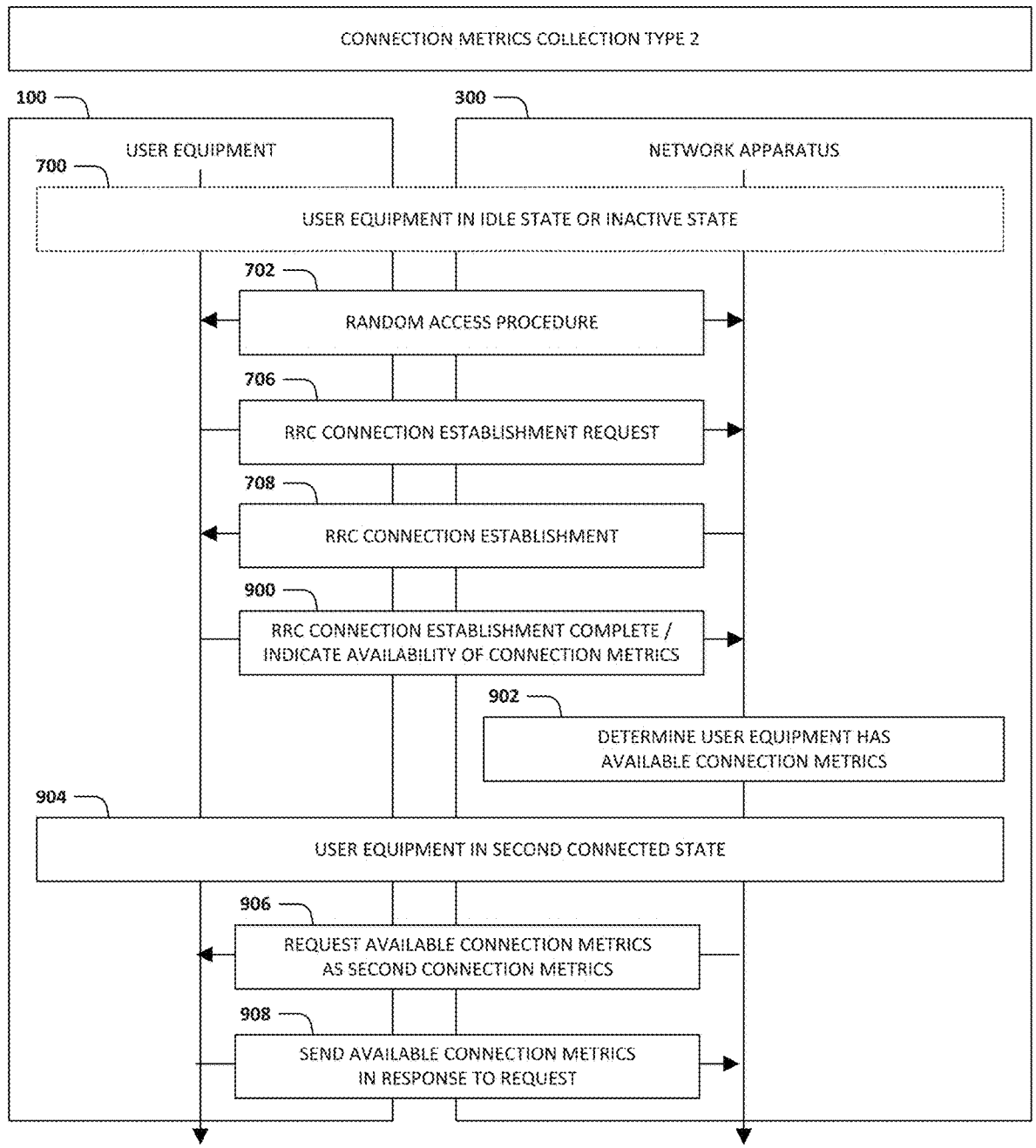
FIG. 9 is a diagram illustrating another example interaction between a user equipment and a network apparatus according to some example embodiments.

FIG. 9 is a diagram illustrating another example interaction between a user equipment and a network apparatus according to some example embodiments. The example interaction of FIG. 9 may correspond to an example of a second measurement type in which some connection metrics, such as early measurement information, mobile history, and/or cell occupancy time, are obtained based upon an indication of the availability of such connection metrics by the user equipment 100 during a transition to a connected state 108. That is, the processing circuitry 104 of the network apparatus 300 may be configured to receive from the user equipment 100 an indicator of an availability of the second connection metrics, send to the user equipment 100 a request for the second connection metrics, and receive a response from the user equipment 100 that includes the second connection metrics.

In the example interaction of FIG. 9, user equipment 100 is initially 700 in an idle state 108 or an inactive state 108. The user equipment 100 and the network apparatus 300 are configured to communicate in a random access procedure 702. The processing circuitry 104 of the user equipment 100 may be configured to initiate 706 an RRC connection establishment request message. The processing circuitry 104 of the network apparatus 300 may be configured to receive the RRC connection establishment request message and to send 708 an RRC connection establishment message. The processing circuitry of the user equipment 100 may be configured to receive the RRC connection establishment message and to send 900 an RRC connection establishment complete message that includes an indication of an availability of connection metrics, such as early measurement information, mobile history, and/or cell occupancy time. The processing circuitry 104 of the network apparatus 300 may be configured to determine that the user equipment 100 has the available connection metrics based upon the RRC connection establishment complete message. Thereafter, the user equipment 100 and the network apparatus 300 may communicate in the second connected state 904, and the processing circuitry 104 of the network apparatus 300 may be configured to send 906 to the user equipment 100 a request for the available connection metrics, to be used as the second connection metrics. The processing circuitry 104 of the user equipment 100 may be configured to receive the request for the available connection metrics and to send 908 the available connection metrics in response to the request.

Figure 10:
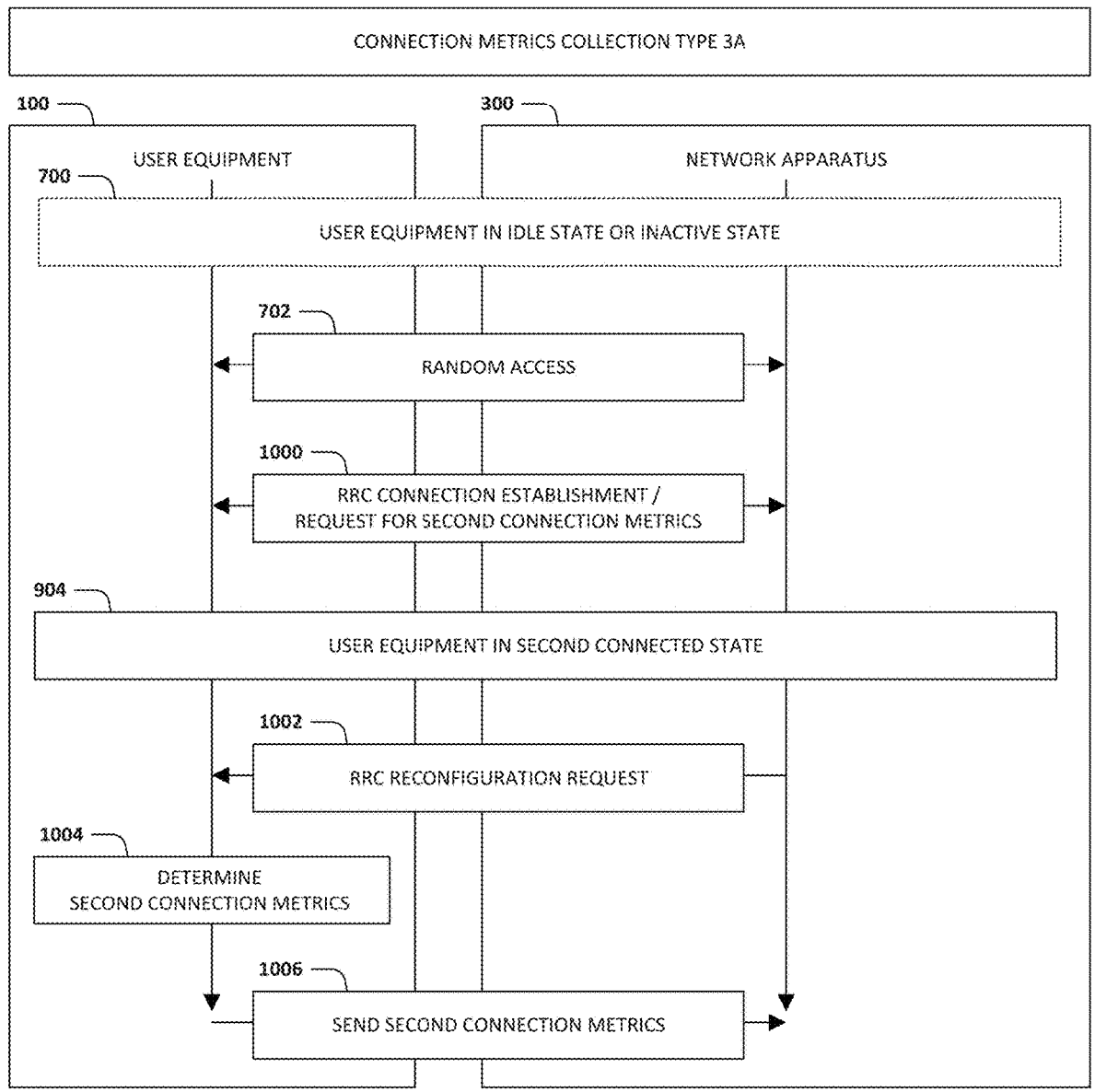
FIG. 10 is a diagram illustrating another example interaction between a user equipment and a network apparatus according to some example embodiments.

FIG. 10 is a diagram illustrating another example interaction between a user equipment and a network apparatus according to some example embodiments. The example interaction of FIG. 10 may correspond to a first example of a third measurement type in which some connection metrics, such as a channel quality indicator metric (CQI), a rank indication metric (RI), a precoding type indicator metric (PTI), a beam quality metric, a reference signal received power metric (RSRP), a reference signal received quality metric (RSRQ), a received signal signal-to-interference-and-noise ratio metric (RS-SINR), and/or a received signal strength indicator metric (RSSI), are obtained by the user equipment 100 during the second connected state based upon a request from the network apparatus 300.

In the example interaction of FIG. 10, user equipment 100 is initially 700 in an idle state 108 or an inactive state 108. The user equipment 100 and the network apparatus 300 are configured to communicate in a random access procedure 702. The user equipment 100 and the network apparatus 300 may be configured to complete an RRC connection establishment, such as in the manner shown in any of the example interactions of FIGS. 7-9. As part of the RRC connection establishment, the processing circuitry of the network apparatus 300 may be configured to send 1000 to the user equipment 100 a request for the second connection metrics.

Thereafter, the user equipment 100 and the network apparatus 300 may communicate in the second connected state 904, and based on an RRC reconfiguration request 1002, the processing circuitry 104 of the network apparatus 300 may be configured to determine 1004 the second connection metrics and to send 1006 the second connection metrics to the network apparatus 300.

Figure 11:
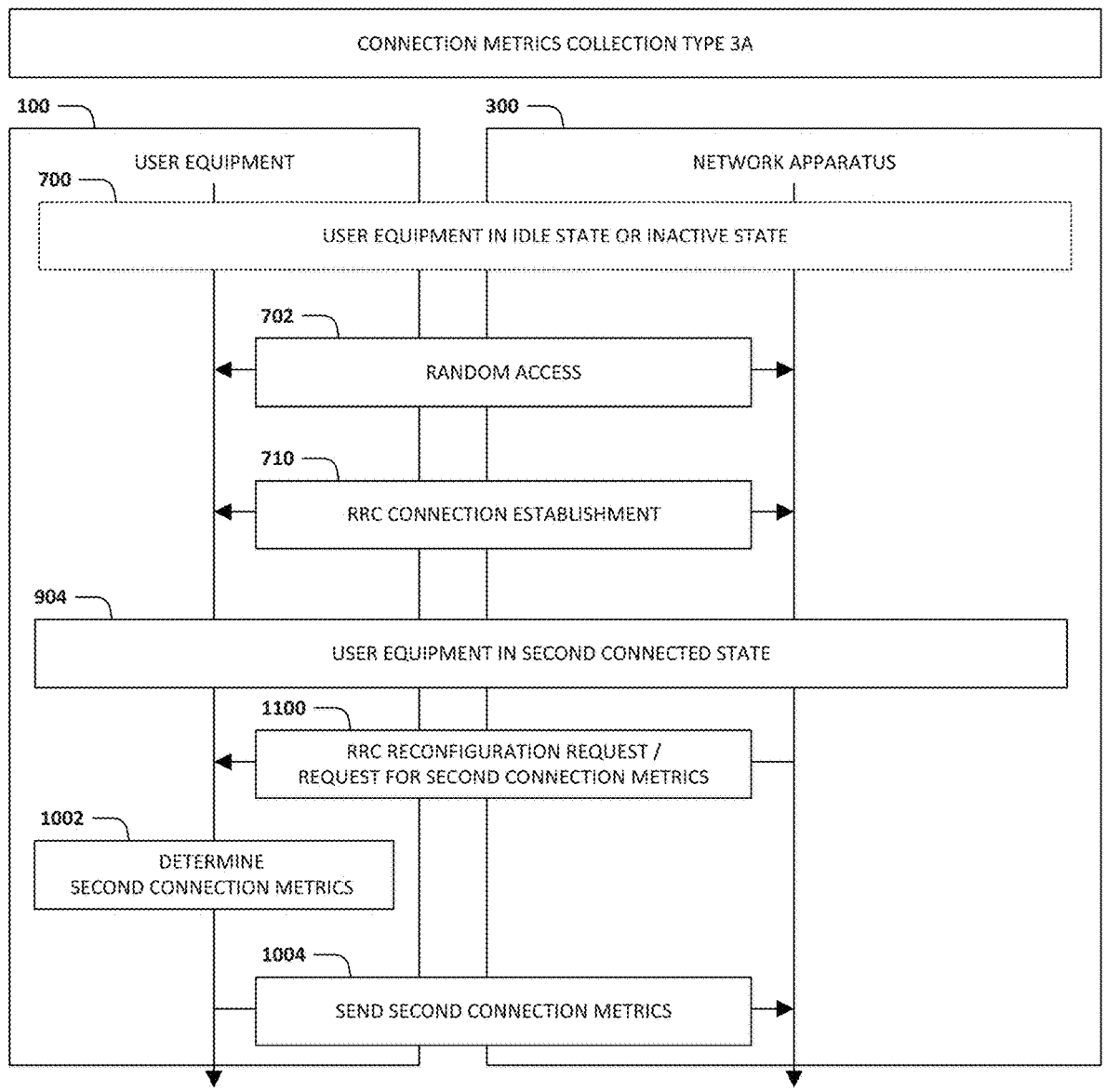
FIG. 11 is a diagram illustrating another example interaction between a user equipment and a network apparatus according to some example embodiments.

FIG. 11 is a diagram illustrating another example interaction between a user equipment and a network apparatus according to some example embodiments. The example interaction of FIG. 11 may correspond to a second example of a third measurement type in which some connection metrics, such as a channel quality indicator metric (CQI), a rank indication metric (RI), a precoding type indicator metric (PTI), a beam quality metric, a reference signal received power metric (RSRP), a reference signal received quality metric (RSRQ), a received signal signal-to-interference-and-noise ratio metric (RS-SINR), and/or a received signal strength indicator metric (RSSI), are obtained by the user equipment 100 during the second connected state based upon an RRC reconfiguration request from the network apparatus 300.

In the example interaction of FIG. 11, user equipment 100 is initially 700 in an idle state 108 or an inactive state 108. The user equipment 100 and the network apparatus 300 are configured to communicate in a random access procedure 702. The user equipment 100 and the network apparatus 300 may be configured to complete an RRC connection establishment, such as in the manner shown in any of the example interactions of FIGS. 7-9. Thereafter, the user equipment 100 and the network apparatus 300 may communicate in the second connected state 904. During the second connected state, the processing circuitry of the network apparatus 300 may be configured to send 1100 to the user equipment 100 an RRC reconfiguration request including a request for the second connection metrics. The processing circuitry 104 of the network apparatus 300 may be configured to determine 1002 the second connection metrics and to send 1004 the second connection metrics to the network apparatus 300.

In some example embodiments, the processing circuitry of a network apparatus 300 may be configured to receive first connection metrics and second connection metrics from the user equipment 100 and to choose the selected configuration based on the first connection metrics and second connection metrics received from the user equipment 100. In some other example embodiments, the processing circuitry of a network apparatus 300 may be configured to generate one or more values of the first connection metrics and/or the second connection metrics based on other connection metrics sent by the user equipment 100 and/or based on measuring a connection with the user equipment. For example, the first connection metrics and/or the second connection metrics include a timing offset metric, which the processing circuitry of the network apparatus 300 may be configured to generate by receiving from the user equipment a timing advance and estimating the timing offset metric based on the timing advance. As another such example, the processing circuitry of the network apparatus 300 may be configured to receive, from the user equipment 100, a first value of a connection metric at a first time and a second value of the connection metric at a second time, and to generate a value of the first connection metrics or the second connection metrics based on the first value and the second value, for example, by averaging the first value and the second value.

IV. Choosing Selected Configuration

In some example embodiments, the processing circuitry 104 of the network apparatus 300 may be configured to choose a selected configuration for the user equipment 100 as (i) the first configuration or (ii) the second configuration, based on the first connection metrics and the second connection metrics, in some different ways.

In some example embodiments, the first connection metrics may include a plurality of values, and the second connection metrics may include a plurality of corresponding values, where some values and corresponding values may be more significant to the choice of the first configuration or the second configuration than other values. The processing circuitry 104 of the network apparatus 300 may be configured to choose the selected configuration by evaluating a first value of the first connection metrics and a first corresponding value of the second connection metrics. If the evaluation enables the processing circuitry 104 of the network apparatus 300 to choose between the first configuration and the second configuration, the processing circuitry 104 of the network apparatus 300 may be configured to choose the selected configuration based on the first value. For example, the processing circuitry 104 of a network apparatus 300 may be configured to choose the selected configuration as the first configuration based on the first value in the first connection metrics matching the first corresponding value in the second connection metrics, and to choose the selected configuration as the second configuration based on the first value in the first connection metrics differing from the first corresponding value in the second connection metrics. As one such example, the value may be a serving cell identifier of a serving cell to which the user equipment 100 is connected, and the processing circuitry 104 of the network apparatus 300 may be configured to choose the selected configuration as the first configuration if the same serving cell identifier is included in both the first connection metrics and the second connection metrics (e.g., maintaining the previous connection metrics of the first connection state), and to choose the selected configuration as the second configuration if different serving cell identifiers are included in the first connection metrics and the second connection metrics (e.g., generating new connection metrics based on the change of serving cell). If the evaluation does not enable the processing circuitry 104 of the network apparatus 300 to choose between the first configuration and the second configuration (for example, an absence of a serving cell identifier in the first connection metrics and/or the second connection metrics), the processing circuitry 104 of the network apparatus 300 may be configured to next evaluate a second value of the first connection metrics and the second connection metrics, etc., until the processing circuitry 104 of the network apparatus 300 is enabled to choose the selected configuration.

In some example embodiments, processing circuitry 104 of a network apparatus 300 may be configured to choose the selected configuration based on a similarity between the first connection metrics and the second connection metrics. For example, the processing circuitry 104 of the network apparatus 300 may be configured to determine determining the similarity between the first connection metrics and the second connection metrics (e.g., as a difference, a ratio, or a matching or discrepancy of discrete or continuous values), to choose the first configuration based on the similarity being within a threshold, and to choose the second configuration based on the similarity exceeding the threshold. In some example embodiments, each of the first connection metrics and the second connection metrics includes at least two values, and the processing circuitry 104 of the network apparatus 300 may be configured to determine the similarity on a per-value basis, for example, by determining the similarity between each value of the first connection metrics and each corresponding value of the second connection metrics, and choosing the selected configuration as the first configuration or the second configuration based on the similarity for each value. In some example embodiments, the processing circuitry 104 of the network apparatus 300 may be configured to choose the selected configuration based on an aggregation of the per-value similarities. For example, the processing circuitry 104 of the network apparatus 300 may be configured to determine, for each value of the first connection metrics, a similarity between the value and a corresponding value of the second connection metrics, and to choose the selected configuration as the first configuration or the second configuration based on an aggregation of the similarities of the values.

In some example embodiments, processing circuitry 104 of a network apparatus 300 may be configured to choose the selected configuration as the second configuration by generating the second configuration for the user equipment 100 based on the second connection metrics, that is, based on the updated connection metrics of the user equipment 100 during the second connection state. For example, based upon choosing the second connection metrics (e.g., due to the similarity of the first connection metrics and the second connection metrics exceeding a threshold), the processing circuitry 104 of the network apparatus 300 may be configured to receive, from the user equipment a connection metrics report including at least one additional connection metric, and to generate the second configuration based on the connection metrics report. For example, the second connection metrics upon which the selected configuration is chosen may include a partial or initial set of connection metrics collected by the user equipment 100 (e.g., connection metrics that may be rapidly collected, and/or that are likely to enable the processing circuitry 104 of the network apparatus 030 to choose between the first configuration and the second configuration). The connection metrics report may include a full collection of the connection metrics of the user equipment 100 in the second connection state, which may involve a delay in collecting the metrics. In some example embodiments, processing circuitry 104 of the network apparatus 300 may be configured to avoid the delay in collecting the connection metrics report, which may appear to a user of the user equipment 100 as latency in transitioning to the connected state, by choosing the first configuration (e.g., the selected configuration of the user equipment 100 during a previous connected state) based upon the first connection metrics being similar to the second connection metrics. In case the first connection metrics are not similar to the second connection metrics, the processing circuitry 104 of the network apparatus 300 may be configured to await the receipt of the connection metrics report including the updated connection metrics for the second connected state in order to generate and send to the user equipment 100 in order to serve the user equipment 100 based upon the updated connection metrics.

V. Machine Learning Models

In some example embodiments, processing circuitry 104 of a network apparatus 300 may include one or more machine learning models that may be used to configure the user equipment 100.

In some example embodiments, the processing circuitry 104 of the network apparatus 300 may perform some operations by artificial intelligence and/or machine learning, including deep learning. As an example, the processing circuitry 104 of the network apparatus 300 may include an artificial neural network that is trained on a set of training data by, for example, a supervised, unsupervised, and/or reinforcement learning model, and wherein the processing circuitry may process a feature vector to provide output based upon the training. Such artificial neural networks may utilize a variety of artificial neural network organizational and processing models, such as convolutional neural networks (CNN), deconvolutional neural networks, recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM). Alternatively or additionally, the processing circuitry may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests.

Figure 12:
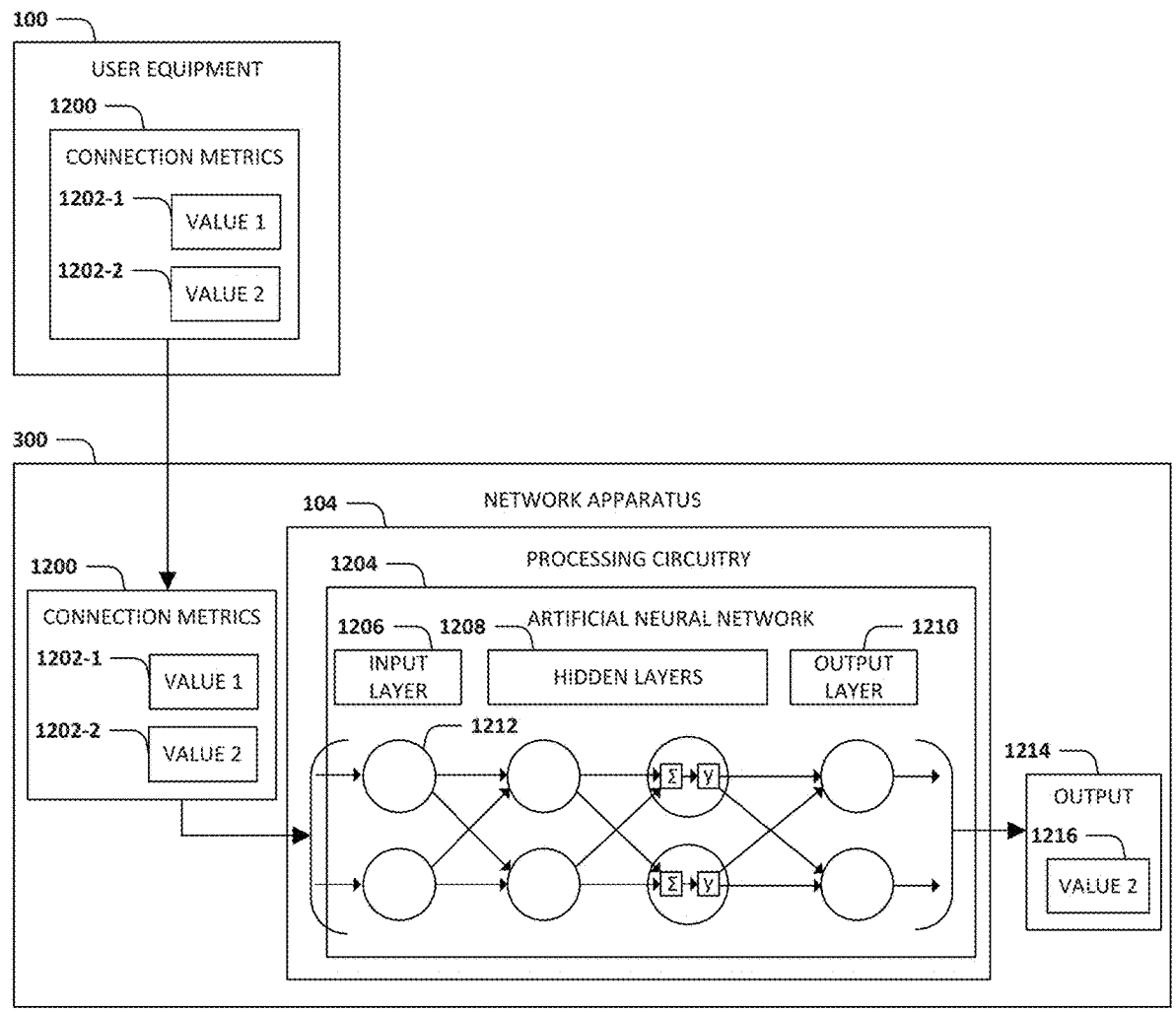
FIG. 12 is a diagram illustrating an example of a network apparatus including a machine learning model according to some example embodiments.

FIG. 12 is a diagram illustrating an example of a network apparatus 300 including a machine learning model according to some example embodiments.

The processing circuitry 104 of the network apparatus 300 includes an artificial neural network 104 that is trained to determine a selected value among at least two values of connection metrics 1200 received from user equipment 100, such as first connection metrics or second connection metrics. The artificial neural network 1204 is organized as sets of neurons 1212 arranged in a series of layers including an input layer 1206, a hidden layer 1208, and an output layer 1210. In the input layer 102, each neuron receives one of the values 1202-1, 1202-2 of the connection metrics 1200 and to output the respective values 1202-1 to each neuron 1212 of a first hidden layer 1208.

In the fully-connected model of an artificial neural network 1204 shown in FIG. 12, each connection between two neurons 1212 of any two successive layers (such as a neuron 1212 of the input layer 1206 and a neuron 1212 of the hidden layer 1208) includes a weight by which the output of the neuron 1212 of the preceding layer is multiplied to produce input to the neuron 1212 of the following layer. In the hidden layers 1208, each neuron 1212 is configured to perform a weighted sum of the weighted inputs from the neurons 1212 of the preceding layer and applies an activation function (such as a linear activation function, a rectified linear (ReLU) activation function, or a sigmoid activation function) to generate output to be received by or the neurons 1221 of the next layer of the artificial neural network 1204. Each neuron 1212 of the output layer 1210 may be configured to apply an activation function to the weighted sum of the outputs of the neurons 1212 of the last hidden layer 1208 to produce the output 1214 of the artificial neural network 1204.

In some example embodiments, the processing circuitry 104 of a network apparatus 300 may be configured to train the artificial neural network 1204, for example, using supervised, unsupervised, and/or reinforcement-based training or learning. For example, in supervised training, the network apparatus 300 may store and/or have access to a data set that includes both inputs to the artificial neural network 1204 and, for each input, a corresponding output 12114 that is to be generated as output 1214 by the artificial neural network 1204 based upon processing the input. During supervised batch training, the processing circuitry 104 may be configured to process the data set with the artificial neural network 1204, to determine an aggregate error between the outputs 1214 of the artificial neural network 1204 and the corresponding outputs in the data set, and to update the weights of the interconnections between the neurons 1212 based on the aggregate error such that the artificial neural network produces output 1214 that is closer to the corresponding outputs in the data set for each input. During stochastic training, the processing circuitry 104 may be configured to process each individual input of the data set with the artificial neural network 1204, to determine a per-input error between the output 1214 of the artificial neural network 1204 and the corresponding output for the input, and to update the weights of the interconnections between the neurons 1212 based on the individual error.

The processing circuitry 104 may train the artificial neural network 1204 to a point of convergence (e.g., where the artificial neural network 1204 processes the inputs of the data set and produces corresponding outputs within an error tolerance) and may thereafter invoke the artificial neural network 1204 to process new input for which the output 1214 is not known a priori or determinable by the processing circuitry 1204. The processing circuitry 1204 may train and invoke the artificial neural network 1204 to perform a variety of operations of the network apparatus 300, such as classification, clustering, regression, pattern detection, and/or the generation of new data.

Although only a few layers and a few neurons 1212 in each layer are shown in the diagram of FIG. 12, it is to be appreciated that some artificial neural networks 1204 included in some example embodiments may be organized according to different hyperparameters. That is, the artificial neural network 1204 may include different numbers, type, and arrangements of layers and/or different numbers, types, and arrangements of the neurons 1212 within each layer than those shown in FIG. 12.

In FIG. 12, the network apparatus 300 invokes the artificial neural network 1204 to determine, from the values 1202-1, 1202-2 of a set of connection metrics 1200 (such as the first connection metrics or the second connection metrics), a selected value 1216 identified by the output 1214 that is to be used in choosing the selected configuration of the user equipment 100. For example, the first connection metrics includes at least two values 1202-1, 1202-2, and the processing circuitry 104 may include a machine learning model such as an artificial neural network 1204 that has been trained to determine a selected value 1216 among the at least two values. Based upon first connection metrics 1200 received from the user equipment 100, the processing circuitry 1204 of the network apparatus 300 may be configured to choose a selected configuration of the user equipment 100 by invoking the machine learning model with the first value and the second value of the connection metrics 120 to determine the selected value 1216, for example, which of the values of the connection metrics 1200 is to be evaluated in order to choose the selected configuration as the first configuration or the second configuration. The processing circuitry 104 may be configured to receive the output 1214 from the artificial neural network 1204 including the selected value 1216 and to choose the selected configuration based on the selected value of the first connection metrics and a corresponding value of the second connection metrics.

In some example embodiments, processing circuitry 104 of a network apparatus 300 may be configured to invoke a machine learning algorithm to choose the selected configuration as (i) the first configuration or (ii) the second configuration. For example, the processing circuitry 104 may include a machine learning model, such as an artificial neural network 1204, that is trained to output a selected configuration based on the first connection metrics and the second connection metrics (that is, to perform the choosing, and/or to generate the second configuration based on the second connection metrics). The processing circuitry 104 may be configured to choose the selected configuration by invoking the machine learning model with the first connection metrics and the second connection metrics and choosing the selected configuration that is output from the machine learning model.

In some example embodiments, processing circuitry 104 of a network apparatus 300 may be configured to train a machine learning model, such as an artificial neural network 1204. In some example embodiments, the processing circuitry 300 is configured to train the machine learning model based upon connections with other user equipment 100, that is, based upon previous determinations of connection metrics and choices of selected configurations between the network apparatus 300 and other user equipment 100. The processing circuitry 104 may be configured to invoke such a machine learning model in the course of choosing the selected configuration for the user equipment 100 based upon outcomes that have been learned from performing similar choices for connecting to other user equipment 100. In some other example embodiments, the processing circuitry 300 is configured to train the machine learning model based upon previous connections with the user equipment 100. The processing circuitry 104 may be configured to invoke such a machine learning model in the course of choosing the selected configuration for the user equipment 100 based upon outcomes that have been learned from performing similar choices for connecting to the user equipment 100 in previous connection states.

Some example embodiments may utilize machine learning for a variety of other aspects in establishing and maintaining a connection with the user equipment 100. For example, the processing circuitry 104 of a network apparatus 300 may be configured to use machine learning to validate the choosing of the selected configuration for the user equipment 100; to reevaluate the selected configuration for the user equipment 100 after initially configurating the user equipment 100 with the selected configuration, for example, to verify that the selected configuration is still suitable in view of subsequently obtained connection metrics; to determine the configuration of the network apparatus 300, e.g., to facilitate load-balancing of a plurality of user equipment 100 that are served by a plurality of serving cells; and/or to determine whether to initiate a retraining of the machine learning, such as in the case of drift. Many such uses of machine learning models may be featured in some example embodiments of the network apparatus 300.

VI. Usage of Terms

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.)

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing UE, base stations, eNBs, RRHs, gNBs, femto base stations, network controllers, computers, Central Units (CUs), ng-eNBs, other radio access or backhaul network elements, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, user equipment 100 (UE), base stations, eNodeB units (eNBs), RRHs, gNBs, femtocell base stations, network controllers, computers, Central Units (CUs), ng-eNBs, other radio access or backhaul network elements, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to some specific embodiments. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

The invention claimed is:

1. A network apparatus comprising:
a memory; and
processing circuitry configured to,
receive first connection metrics based on a first connection with a user equipment that is using a first configuration, the first connection metrics obtained during a first connected state,
receive second connection metrics based on a second connection with the user equipment, the second connection metrics obtained during a transition to a second connected state, the transition to the second connected state occurring subsequent to the first connected state,
choose a selected configuration as (i) the first configuration or (ii) a second configuration for the second connection state, the choosing based on the first connection metrics and the second connection metrics, and
send the selected configuration to the user equipment.

2. The network apparatus of claim 1, wherein receiving the second connection metrics includes,
performing a connection establishment to establish the second connection with the user equipment during the transition, and
receiving the second connection metrics within the connection establishment.

3. The network apparatus of claim 1, wherein receiving the second connection metrics includes,
receiving from the user equipment an indicator of an availability of the second connection metrics,
sending to the user equipment a request for the second connection metrics, and
receiving a response from the user equipment that includes the second connection metrics.

4. The network apparatus of claim 1, wherein receiving the second connection metrics includes,
sending to the user equipment a request to measure the second connection metrics, and
receiving a response from the user equipment that includes the second connection metrics in response to the request.

5. The network apparatus of claim 1, wherein the first connection metrics and the second connection metrics include a metric selected from a metric set comprising:
a timing advance metric,
a reference signal received power metric,
a reference signal received quality metric,
a reference signal signal-to-interference-and-noise metric,
a received signal strength indicator metric,
a channel state information metric,
a channel quality information metric,
a selected beam index metric, and
a cell occupancy time metric.

6. The network apparatus of claim 1,
wherein the first connection metrics and the second connection metrics include a timing offset metric, and
wherein the processing circuitry is further configured to generate the timing offset metric by,
receiving from the user equipment a timing advance, and
estimating the timing offset metric based on the timing advance.

7. The network apparatus of claim 1, wherein the processing circuitry is further configured to generate at least one value of the first connection metrics or the second connection metrics by averaging a first value received from the user equipment at a first time and a second value received from the user equipment at a second time.

8. The network apparatus of claim 1, wherein choosing the selected configuration includes, choosing the selected configuration as the first configuration based on a value in the first connection metrics matching a corresponding value in the second connection metrics, and choosing the selected configuration as the second configuration based on the value in the first connection metrics differing from the corresponding value in the second connection metrics.

9. The network apparatus of claim 8, wherein
the value in the first connection metrics includes a serving cell identifier of the first connection during the first connected state, and
the corresponding value in the second connection metrics includes the serving cell identifier of the second connection during the transition to the second connected state.

10. The network apparatus of claim 1, wherein the choosing includes:
determining a similarity between the first connection metrics and the second connection metrics,
choosing the first configuration based on the similarity being within a threshold, and
choosing the second configuration based on the similarity exceeding the threshold.

11. The network apparatus of claim 1, wherein
each of the first connection metrics and the second connection metrics includes at least two values, and
the choosing includes,
for each value of the first connection metrics, determining a similarity between the value and a corresponding value of the second connection metrics, and
choosing the selected configuration as the first configuration or the second configuration based on the similarity for each value.

12. The network apparatus of claim 1, wherein
each of the first connection metrics and the second connection metrics includes at least two values, and
the choosing includes,
for each value of the first connection metrics, determining a similarity between the value and a corresponding value of the second connection metrics, and
choosing the selected configuration as the first configuration or the second configuration based on an aggregation of the similarities of the values.

13. The network apparatus of claim 1, wherein choosing the selected configuration as the second configuration includes generating the second configuration based on the second connection metrics.

14. The network apparatus of claim 13, wherein the generating includes:
receiving from the user equipment a connection metrics report including at least one additional connection metric, and
generating the second configuration based on the connection metrics report.

15. The network apparatus of claim 1, wherein
the first connection metrics includes at least two values,
the processing circuitry includes a machine learning model that is trained to determine a selected value among the at least two values, and
the choosing includes,
invoking the machine learning model with the first connection metrics and the second connection metrics to determine the selected value, and
choosing the selected configuration based on the selected value of the first connection metrics and a corresponding value of the second connection metrics.

16. The network apparatus of claim 15, wherein the processing circuitry is further configured to train the machine learning model based upon connections with other user equipment.

17. The network apparatus of claim 15, wherein the processing circuitry is further configured to train the machine learning model based upon previous connections with the user equipment.

18. The network apparatus of claim 1, wherein
the processing circuitry includes a machine learning model that is trained to output the selected configuration based on the first connection metrics and the second connection metrics, and
the choosing includes,
invoking the machine learning model with the first connection metrics and the second connection metrics, and
choosing the selected configuration that is output from the machine learning model.

19. A method of configuring user equipment, comprising:
receiving, by processing circuitry, first connection metrics based on a first connection with a user equipment that is using a first configuration, the first connection metrics obtained during a first connected state;
receiving, by the processing circuitry, second connection metrics based on a second connection with the user equipment the second connection metrics obtained during a transition to a second connected state, the transition to the second connected state occurring subsequent to the first connected state;
choosing, by the processing circuitry, a selected configuration as (i) the first configuration or (ii) a second configuration for the second connection state, the choosing based on the first connection metrics and the second connection metrics; and
sending, by the processing circuitry, the selected configuration to the user equipment.

20. A network apparatus comprising:
a memory; and
processing circuitry configured to,
receive first connection metrics based on a first connection with a user equipment using a first configuration the first connection metrics obtained during a first connected state,
receive second connection metrics based on a second connection with the user equipment, the second connection metrics obtained during a transition to a second connected state, the transition to the second connected state occurring subsequent to the first connected state,
choose a selected configuration as the first configuration based on a metrics similarity of the first connection metrics and the second connection metrics being within a threshold,
generate the selected configuration as a second configuration for the second connection state based on the metrics similarity of the first connection metrics and the second connection metrics exceeding the threshold, and
send the selected configuration to the user equipment.

21. The network apparatus of claim 1, wherein
the first connection is a connection between the user equipment and a serving cell, and the second connection is a connection between the user equipment and the serving cell.

* * * * *